(12) United States Patent
Yasuda

(10) Patent No.: US 7,069,473 B2
(45) Date of Patent: Jun. 27, 2006

(54) COMPUTER RECOVERY METHOD AND SYSTEM FOR RECOVERING AUTOMATICALLY FROM FAULT, AND FAULT MONITORING APPARATUS AND PROGRAM USED IN COMPUTER SYSTEM

(75) Inventor: Shigeru Yasuda, Tokyo (JP)

(73) Assignee: NEC Corporation, Tokyo (JP)

( * ) Notice: Subject to any disclaimer, the term of this patent is extended or adjusted under 35 U.S.C. 154(b) by 626 days.

(21) Appl. No.: 10/265,145

(22) Filed: Oct. 7, 2002

(65) Prior Publication Data
US 2003/0070114 A1  Apr. 10, 2003

(30) Foreign Application Priority Data
Oct. 5, 2001  (JP) ............................ 2001-309739

(51) Int. Cl.
*G06F 11/00* (2006.01)
(52) U.S. Cl. ....................................................... 714/37
(58) Field of Classification Search ................. 714/26, 714/33, 37
See application file for complete search history.

(56) References Cited

U.S. PATENT DOCUMENTS

| | | | | |
|---|---|---|---|---|
| 4,922,491 A | * | 5/1990 | Coale ........................... | 714/26 |
| 5,214,653 A | * | 5/1993 | Elliott et al. ................... | 714/26 |
| 5,539,877 A | * | 7/1996 | Winokur et al. ............... | 714/26 |
| 5,592,614 A | * | 1/1997 | Peters .......................... | 714/26 |
| 5,680,541 A | * | 10/1997 | Kurosu et al. ................ | 714/26 |
| 5,983,364 A | * | 11/1999 | Bortcosh et al. .............. | 714/25 |
| 6,081,664 A | * | 6/2000 | Nowlin, Jr. ................... | 717/127 |
| 6,085,335 A | * | 7/2000 | Djoko et al. ................... | 714/26 |
| 6,108,616 A | * | 8/2000 | Borchers et al. ............. | 702/183 |
| 6,324,659 B1 | * | 11/2001 | Pierro .......................... | 714/48 |
| 6,327,677 B1 | * | 12/2001 | Garg et al. .................... | 714/37 |
| 6,357,017 B1 | * | 3/2002 | Bereiter et al. ............... | 714/27 |
| 6,425,093 B1 | * | 7/2002 | Singh et al. ................... | 714/38 |
| 6,691,064 B1 | * | 2/2004 | Vroman ....................... | 702/183 |
| 2003/0126501 A1 | * | 7/2003 | Musman ...................... | 714/26 |
| 2004/0064758 A1 | * | 4/2004 | Novik et al. .................. | 714/37 |
| 2004/0073843 A1 | * | 4/2004 | Dean et al. ................... | 714/37 |
| 2004/0143778 A1 | * | 7/2004 | Vollmar et al. ............... | 714/37 |

FOREIGN PATENT DOCUMENTS

| | | |
|---|---|---|
| JP | S62-133850 A | 6/1987 |
| JP | S63-58553 A | 3/1988 |
| JP | S63-158640 A | 7/1988 |
| JP | S63-182754 A | 7/1988 |
| JP | S63-189960 A | 8/1988 |
| JP | H01-199239 A | 8/1989 |
| JP | H02-310773 A | 12/1990 |
| JP | H03-150643 A | 6/1991 |
| JP | H03-245228 A | 10/1991 |
| JP | H04-62641 A | 2/1992 |
| JP | H05-151013 A | 6/1993 |
| JP | H05-257675 A | 10/1993 |

(Continued)

*Primary Examiner*—Bryce P. Bonzo
(74) *Attorney, Agent, or Firm*—Sughrue Mion, PLLC

(57) ABSTRACT

A fault monitoring apparatus is connected to computer systems and monitors a fault in the computer systems. The fault monitoring apparatus is provided with a storage section for storing and holding fault recovery information including rules for defining recovery operations when faults occur in the computer systems, and when a fault occurs in the computer systems, retrieves the rules previously set in the fault recovery information and instructs the computer systems so as to perform a recovery operation corresponding to a rule matching to the fault which occurs in the computer systems.

21 Claims, 12 Drawing Sheets

FOREIGN PATENT DOCUMENTS

| | | |
|---|---|---|
| JP | H07-262056 A | 10/1995 |
| JP | H08-36502 A | 2/1996 |
| JP | H08-212096 A | 8/1996 |
| JP | H08-241227 A | 9/1996 |
| JP | H08-305661 A | 11/1996 |
| JP | H09-198275 A | 7/1997 |
| JP | H09-231256 A | 9/1997 |
| JP | H10-501907 A | 2/1998 |
| JP | H10-83382 A | 3/1998 |
| JP | H10-91402 A | 4/1998 |
| JP | H10-116260 A | 5/1998 |
| JP | H10-124346 A | 5/1998 |
| JP | H10-312321 A | 11/1998 |
| JP | H11-134223 A | 5/1999 |
| JP | H11-184825 A | 7/1999 |
| JP | H11-338729 A | 12/1999 |
| JP | 2000-148538 A | 5/2000 |
| JP | 2000-187585 A | 7/2000 |
| JP | 2000-353108 A | 12/2000 |
| JP | 2001-22717 A | 1/2001 |
| JP | 2001-34509 A | 2/2001 |
| JP | 2001-67288 A | 3/2001 |
| JP | 2001-109729 A | 4/2001 |

\* cited by examiner

COMPUTER RECOVERY METHOD AND SYSTEM FOR RECOVERING AUTOMATICALLY FROM FAULT, AND FAULT MONITORING APPARATUS AND PROGRAM USED IN COMPUTER SYSTEM

BACKGROUND OF THE INVENTION

1. Field of the Invention

The present invention relates to a system technique for an information processing apparatus, and more particularly relates to a recovery method and system for recovering automatically from a fault, and a fault monitoring apparatus and program used in a computer system.

The present application claims priority of Japanese Patent Application No. 2001-309739 filed on Oct. 5, 2001, which is hereby incorporated by reference.

2. Description of the Related Art

A redundant computer system is used in which an active apparatus is changed to a backup apparatus (standby apparatus) when a fault occurs. As the redundant computer system, techniques are generally used in which a plurality of standby components are prepared in the computer system or a standby computer system is prepared, and when a fault occurs in a component or an operating system, a standby component or a standby operating system is used.

In a non-redundant computer system, when a fault occurs in a component, the system stops from when the fault occurs until a maintenance person changes a fault-component by manually. However, in the redundant computer system, it is possible to shorten a system stopping time while a component is changed. In recent computer systems, systems are configured redundantly and it is important to further shorten the system stopping time.

Now, in the redundant computer system or a like, it is desired to provide a function in which recovery operations are changeable in accordance with a type of a fault which occurs. For example, when a temporary intermittent fault occurs in a component in the redundant computer system, in accordance with a policy of the system, it is desired to select one procedure in which the fault-component is changed immediately or another procedure in which only the fault-component is isolated and an operation is continued.

Also, in a duplex computer system having a first computer system as an active system and a second computer system as a standby system, when the active system, the first computer system becomes down caused by a fault of a component, the standby system, the second computer system is switched in service. Then, while the second computer system continues to process jobs, a the worker in charge of system maintenance changes the fault-component, and the first computer system is started again as the standby system. In the duplex computer system as mentioned above, while the worker in charge of system maintenance changes the fault-component and the first computer system is started again as the standby system, the second computer system cannot be called as a redundant system. In other words, during changing the fault-component of the active system, when the second computer system which is changed from the standby system to the active system also becomes down because of a fault, all jobs stop.

Also, in a computer system, it is desired to execute a fault recovery operation flexibly by taking a computer system configuration into consideration. When the computer system has two different kinds of operation systems, two operation systems are different from each other in operation for fault recovery. Therefore, it is desired to carry out a function for integrated-managing an automatic recovery process for different operating systems.

Recently, a large-scale system using a plurality of operating systems is arranged, and each operating system having redundancy is used. The inventor studies a technique in which, in this system, an automatic fault recovery process is integrated and managed by using a fault monitoring apparatus in order to reduce person-hours for system maintenance. As a result, the inventor reaches to complete the present invention which will be described later.

Further, when a redundant computer system is arranged, a cost should be considered. When a fault-tolerant system in which a component of a system can be changed while the system is operating, or a system is made to be a cluster, thus a system cost becomes expensive.

In the redundant computer system, when it is possible to carry out a function for detecting a fault caused by a combination of components, the function is effective in the fault recovery process.

As a system having a fault recovery function, Japanese Patent Application Laid-open No. 2001-67288 discloses an apparatus and a system in which when a fault occurs, a virtual system is arranged in accordance with fault recovery information stored in a database and recovery of the system is tried in accordance with the virtual system, thereby recovering the system, and when the system can not be recovered, information at that time is notified to a server prepared as a support apparatus in order to carry out the fault recovery function. However, the disclosed system having the fault recovery function in a client-server system is absolutely different from the present invention as to all technical ideas, configurations, operations, and effects.

SUMMARY OF THE INVENTION

In view of the above, it is an object of the present invention to provide a recovery method and system for automatically recovering from a fault, and a fault monitoring apparatus and program used in a computer system in other words, capable of dynamically changing a configuration of a computer in accordance with a type of a fault which occurs.

According to a first aspect of the present invention, there is provided a computer recovery system for recovering automatically from a fault including a at least one computer system and a fault monitoring apparatus for monitoring a fault in the at least one computer system, wherein the fault monitoring apparatus is provided with a storage section for storing and holding fault recovery information including rules for defining recovery operations when faults occur in the at least one computer system, and a recovery instruction section, when a fault occurs in the at least one computer system, for retrieving the rules previously set in the fault recovery information and for instructing the at least one computer system in such a manner that a recovery operation corresponding a rule matching to the fault which occurs in the at least one computer system.

In the foregoing, a preferable mode is one wherein the fault recovery information includes a rule in which a condition and a procedure for executing the recovery operation from the fault are designated using a rule designation language which is previously set.

Also, a preferable mode is one wherein the at least one computer system is provided with fault monitoring agent communicating with the fault monitoring apparatus, and wherein when a fault occurs in the at least one computer system, the fault monitoring agent acting in the at least one computer system notify the fault monitoring apparatus of fault information concerning the fault which occurs.

Also, a preferable mode is one wherein the fault recovery information includes component configuration information having information about each component making up at least one computer system to be monitored by the fault monitoring apparatus, wherein when the at least one computer system becomes monitored as an object to be monitored by the fault monitoring apparatus, the fault monitoring apparatus instructs to a fault monitoring agent acting in the at least one computer system to notify the information concerning each component in at least one computer system and configuration information concerning connection of the each component, and wherein the fault monitoring apparatus automatically obtains the information concerning each component from the at least one computer system which is the object of monitoring and sets the information concerning each component in the component configuration information.

Also, a preferable mode is one wherein the fault recovery information includes component characteristic information including information showing characteristics of components included in the at least one computer system monitored by the fault monitoring apparatus, and wherein the fault monitoring apparatus, when instructing a fault recovery operation to the at least one computer system in which the fault occurs, considers efficiencies concerning components included in the at least one computer system based on the component characteristic information, and instructs the at least one computer system in which the fault occurs so as to select components which are used efficiently.

Also, a preferable mode is one wherein the fault recovery information includes types of past faults which occurred and configuration information of the at least one computer system at a time at which a fault occurs as fault example storage information, and wherein the fault monitoring apparatus, when instructing a fault recovery operation to the at least one computer system in which the fault occurs, refers to fault information of past occurrences, and instructs the at least one computer system in which the fault occurs so as to avoid a computer system in which a fault is apt to occur.

Also, a preferable mode is one wherein the fault recovery information includes a system requisite rule which is a rule of a computer system to be met by the at least one computer system as an object of monitoring and information for defining an operation for satisfying the rule as system configuration rule information, and wherein the fault monitoring apparatus, when fault recovery of the at least one computer system in which a fault occurs, instructs the at least one computer system to change a computer system configuration after the fault recovery operation in accordance with a request specification of a whole system of the at least one computer system based on the system requisite rule.

Also, a preferable mode is one wherein in the fault monitoring apparatus, the fault recovery information includes a fault type judging rule in which, when a fault occurs in the at least one computer system, a rule for judging at which position the fault occurs and what type of a fault as a recovery rule, and an operation specifying section in which an operation is specified when the fault occurs, whereby when a fault occurs in the at least one computer system, the fault information indicating a fault cause is notified from the fault monitoring agent to the fault monitoring apparatus, which refers to the fault recovery rule, retrieves a fault type judging rule corresponding to a condition of the fault which occurs, and instructs the fault monitoring agent of an operation of contents described in the operation specifying section corresponding to the fault type judging rule matching the fault.

Also, a preferable mode is one wherein the fault monitoring apparatus includes:

a first processing section, when a fault occurs in the at least one computer system, for checking whether the fault which occurs is a component fault or not, and for, when the fault is the component fault, storing system configuration information at a time when the fault occurs in a storage area for memorizing fault examples as fault example storage information;

a second processing section for referring to the fault example storage information to refer to past fault examples, for checking whether or not there is a same fault example that has occurred this time, for, when there is the same fault example, comparing system configuration information in the past same fault example with a computer system configuration in which the fault occurs, for extracting a feature of the computer system configuration, and for memorizing the characteristic related to the fault information as fault example storage information;

a counting section for counting a frequency of fault occurrences for every feature of the at least one computer system when the fault occurs based on an extracted feature of computer system configuration; and a third processing section for checking a frequency of fault occurrences for every feature of the computer system configuration, and for registering a rule for avoiding an extracted feature of a computer system configuration in the component characteristic information, when the frequency of fault occurrences is more than a predetermined number.

Also, a preferable mode is one wherein in the fault type judging rule, it is specified whether the fault type judging rule is applied to all of computer systems monitored by the fault monitoring apparatus or the fault type judging rule is applied only to at least one specific computer system.

Also, a preferable mode is one wherein in the fault type judging rule, an order of priority is set, the fault type judging rule is retrieved in the order of priority, and a fault type judging rule which coincides first is selected.

Also, a preferable mode is one wherein a fault type judging rule used in a case of an unknown fault occurrence is previously prepared, and an operation specifying section corresponding to the fault type judging rule is registered in a lowest order of priority.

Also, a preferable mode is one wherein in the fault monitoring apparatus, a condition where a load of an operating system exceeds a predetermined load state is previously registered as the fault type judging rule, and an operation is defined in which a CPU (Central Processing Unit) board is added to a corresponding computer system as a fault recovery operation corresponding to the fault type judging rule.

Also, a preferable mode is one wherein the at least one computer system has a plurality of partitions respectively made up of a sub-computer system, and wherein the partitions are defined in the component characteristic information as alternative components, and when a fault occurs in an arbitrary component making up one of the plurality of partitions, the component is automatically changed to an alternative component.

Also, a preferable mode is one wherein the at least one computer system has a plurality of sub-computer systems which are partitions, wherein the fault monitoring apparatus is provided with the fault type judging rule and the operation specifying section which are different for each of the computer systems, and wherein when the operating system differs for each of the partitions, the fault monitoring apparatus integrates each of partitions and executes an automatic fault recovery operation.

Also, a preferable mode is one wherein the fault monitoring apparatus is connected to a plurality of computer systems via a network, wherein a backup component used in the computer systems, wherein fault recovery operation information, when a fault occurs in a component in one system of the computer systems, for removing the component automatically from the system and for arranging an alternative component in the system, is previously defined in the fault monitoring apparatus.

Also, a preferable mode is one wherein a plurality of computer systems is provided, and wherein a standby computer system is operated instead of an active computer system in which a fault occurs.

Furthermore, a preferable mode is one wherein each of the plurality computer systems makes up a cluster system whereby a node is configured, and wherein the fault monitoring apparatus includes at least one piece of node information, information showing that each node is capable of being a cluster with which node, and communication speed information of each network in the fault recovery information.

According to a second aspect of the present invention, there is provided a computer recovery method for recovering automatically from a fault, wherein, in a fault monitoring apparatus for monitoring a fault in at least one computer system, fault recovery information including a rule for defining a recovery operation when the fault occurs in the at least one computer system is memorized, and wherein when a fault occurs in the at least one computer system, the fault monitoring apparatus instructs the at least one computer system to refer to the rule which is previously set in the fault recovery information, to perform a fault recovery operation corresponding to the fault which occurs and to execute the recovery operation corresponding to the rule.

In the foregoing, a preferable mode is one wherein the fault recovery information includes a rule in which a condition for executing a recovery operation for a fault and the recovery operation specified in a rule specifying language.

According to a third aspect of the present invention, there is provided a computer recovery method for recovering automatically from a fault including:

a first step, when a fault occurs in at least one computer system, of notifying a fault monitoring apparatus of fault information by a fault monitoring agent in the at least one computer system in which the fault occurs;

a second step, by the fault monitoring apparatus, of storing the fault information in a fault example storage area, and of extracting a feature of a computer system configuration for the fault information;

a third step, by the fault monitoring apparatus, of referring to a fault recovery rule, of searching a fault type judging rule corresponding to a condition, and of instructing a fault monitoring agent to execute an operation described in a corresponding operation specifying section; and a fourth step, by the fault monitoring apparatus, of referring to a system configuration rule, of checking whether all of system requisite rules are met or not, and of instructing the fault monitoring agent to execute an operation described in the operation specifying section corresponding to the system requisite rule when there is non-met system requisite rule.

In the foregoing, a preferable mode is one wherein the fault monitoring apparatus includes a fault recovery information section, the fault recovery information section including:

component configuration information in which information concerning each component in the at least one computer system as an object to be monitored by the fault monitoring apparatus is registered, component characteristic information including information showing characteristics of components making the at least one computer system as the object to be monitored, a fault example storage area for memorizing a history of the fault information which occurs in the at least one computer system as the object to be monitored, a system configuration rule including a system requisite rule which is a rule of a computer system configuration to be met by the at least one computer system as the object to be monitored and an operation specifying section for defining an operation satisfying the system configuration rule, and a fault recovery rule including a fault type judging rule in which when a fault occurs in the at least one computer system, a rule for judging at which position the fault occurs and what type of the fault and an operation specifying section in which an operation to be executed when a fault occurs is specified. Also, a preferable mode is one wherein the second step includes:

a fifth step, when a fault occurs in the at least one computer system, by the fault monitoring apparatus, of checking whether the fault which occurs is a component fault or not, and of memorizing system configuration information at a time of fault occurrence in the fault example storage area in a case of the component fault;

a sixth step, by the fault monitoring apparatus, of referring to the fault example storage area to refer to past fault examples, of checking whether or not there exists a same fault example that has occurred this time, and when there is the same past fault example, of comparing a computer system configuration in the same past fault example with a computer system configuration in which the fault has occurred this time, of extracting a feature of the computer system configuration, and of memorizing the characteristic in the fault example storage area related to the fault information;

a seventh step, by the fault monitoring apparatus, based on extracted feature of the computer system configuration, of counting a frequency of fault occurrences for every feature of the computer system configuration when the fault occurs;

an eighth step, by the fault monitoring apparatus, of checking a frequency of fault occurrences for every feature of the computer system configuration, and of registering a rule for avoiding an extracted feature of a computer system configuration in the component characteristic information, when the frequency of fault occurrences is more than a predetermined number.

Also, a preferable mode is one wherein the third step in the fault monitoring apparatus, includes:

a ninth step of searching the fault recovery rule, checking whether there is an unchecked fault type judging rule or not, and of finishing a process when all of fault type judging rules are checked;

a tenth step of checking whether the fault which occurs matches with a fault type judging rule or not when there exists an unchecked fault type judging rule;

an eleventh step of returning to the step ninth when a fault content does not match with a fault type judging rule, and of instructing a fault monitoring agent to execute contents of the operation specifying section corresponding to the fault judging rule matching with the fault content when there is a fault judging rule matching with the fault content; and a twelfth step of checking whether an instructed operation is executed normally by the fault monitoring agent or not, of finishing a process when the instructed operation is executed normally, and of returning to the step ninth to repeat a same operation for the unchecked fault type judging rule when the instructed operation is not executed normally.

Also, a preferable mode is one wherein the eleventh step in the fault monitoring apparatus, includes:

a thirteenth step of selecting an operation having a highest order of priority among operations described in the operation specifying section;

a fourteenth step of instructing the fault monitoring agent to execute a selected operation; and a fifteenth step of checking whether the selected operation is executed normally or not, of reporting the normal execution to a higher process and of finishing a process when the selected operation is executed normally, of checking whether an operation having a second higher order priority is specified in the operation specifying section or not when the operation fails, of reporting that the operation described in the operation specifying section fails to the higher process and of finishing a process.

Also, a preferable mode is one wherein the fourteenth step in the fault monitoring apparatus, includes:

a sixteenth step of checking whether a system to be an object of an operation is specified during operation defining or not;

a seventeenth step of making a specified system as an object system when the object system is specified;

an eighteenth step of making a system in which a fault occurs as the object system when no system is specified.

Furthermore, a preferable mode is one wherein the fourteenth step in the fault monitoring apparatus, includes:

a nineteenth step of checking whether an operation which will be executed is to change the at least one computer system or not, and of advancing to a twenty second step when the operation is not to change the at least one computer system;

a twentieth step of checking whether an object component of a configuration change operation is specified or not when the operation is to change the at least one computer system;

a twenty first step of referring to the component characteristic information to decide an object component of the configuration change operation when a component to be an object of the configuration change is not specified;

the twenty second step of instructing a specified operation to the fault monitoring agent of the at least one computer system to be recovered;

a twenty third step of checking whether an operation instructed in the at least one computer system is normally executed or not, of reporting to a higher process that the operation is successful, of checking whether an operation object component selected in the twenty first step remains or not when an instructed operation fails, and of returning to the twenty second step when remaining; and a twenty fourth step of reporting that the operation has failed when the operation for all object components has failed.

According to a fourth aspect of the present invention, there is provided a fault monitoring apparatus connected to a at least one computer system and monitoring a fault in the at least one computer system, including:

a storage section for memorizing and holding fault recovery information including a rule which defines a recovery operation when a fault occurs in the at least one computer system, wherein the fault monitoring apparatus, when a fault occurs in the at least one computer system, searches a rule previously set in the fault recovery information and instructs the at least one computer system to execute a recovery operation corresponding to the fault which occurs in the at least one computer system.

In the foregoing, a preferable mode is one wherein the fault recovery information includes a rule in which a condition and a procedure for executing the recovery operation from the fault are designated using a rule designation language which is previously set.

Also, a preferable mode is one wherein the fault recovery information includes component configuration information having information about each component making up the at least one computer system to be monitored by the fault monitoring apparatus, wherein when the at least one computer system becomes monitored as an object to be monitored by the fault monitoring apparatus, the fault monitoring apparatus instructs to a fault monitoring agent acting in the at least one computer system to notify the information concerning each component in the at least one computer system and configuration information concerning connection of the each component, and wherein the fault monitoring apparatus automatically obtains the information concerning each component from the at least one computer system which is the object of monitoring and sets the information concerning each component in the component configuration information.

Also, a preferable mode is one wherein the fault recovery information includes component characteristic information including information showing characteristics of components included in the at least one computer system monitored by the fault monitoring apparatus, and wherein the fault monitoring apparatus, when instructing a fault recovery operation to the at least one computer system in which the fault occurs, considers efficiencies concerning components included in the at least one computer system based on the component characteristic information, and instructs the at least one computer system in which the fault occurs so as to select components which are used efficiently.

Also, a preferable mode is one wherein types of past faults which occurred and configuration information of the at least one computer system at a time at which a fault has occurred are registered as fault example storage information in the storage section, and wherein the fault monitoring apparatus, when instructing a fault recovery operation to the at least one computer system in which the fault occurs, refers to fault information of past occurrences in the fault example storage information, and instructs the at least one computer system in which the fault occurs so as to avoid a computer system in which a fault is apt to occur.

Also, a preferable mode is one wherein a system requisite rule which is a rule of a computer system to be met by the at least one computer system of an object to be monitored and information for defining an operation for meeting the rule are registered as system configuration rule information in the storage section, and wherein there is a controller that, when fault recovery of the at least one computer system in which a fault occurs, instructs the at least one computer system to change a computer system configuration after the fault recovery operation in accordance with a request specification of a whole system of the at least one computer system based on the system requisite rule.

Also, a preferable mode is one further including:

a first processing section, when a fault occurs in the at least one computer system, for checking whether the fault which occurs is a component fault or not, and for, when the fault is the component fault, storing system configuration information at a time when the fault occurs in fault example storage information;

a second processing section for referring to the fault example storage information to refer to past fault examples, for checking whether or not there is a same fault example that has occurred this time, for, when there is the same fault example, comparing system configuration information in the past same fault example with a computer system configuration in which the fault has occurred this time, for extracting a feature of the computer system configuration, and for memorizing the characteristic related to the fault information as fault example storage information in the storage section;

a counting section for counting a frequency of fault occurrences for every feature of the at least one computer system when the fault occurs based on an extracted feature of computer system configuration; and a third processing section for checking a frequency of fault occurrences for every feature of the computer system configuration, and for registering a rule for avoiding an extracted feature of a computer system configuration in the component characteristic information, when the frequency of fault occurrences is more than a predetermined number.

Furthermore, a preferable mode is one wherein the fault recovery information includes a fault type judging rule in which, when a fault occurs in the at least one computer system, a rule for judging at which position the fault occurs and what type of a fault, and an operation specifying section in which an operation is specified when the fault occurs, wherein when a fault occurs in the at least one computer system, the fault information indicating a fault cause is notified from the fault monitoring agent to the fault monitoring apparatus, wherein the fault monitoring apparatus which receives the fault information refers to the fault recovery rule, searches a fault type judging rule corresponding to a condition of the fault which occurs, and wherein the fault monitoring apparatus instructs the fault monitoring agent of an operation of contents described in the operation specifying section corresponding to the fault type judging rule matching the fault.

According to a fifth aspect of the present invention, there is provided a program being used in a fault monitoring apparatus connected to computer system, has fault recovery information including a rule for defining a recovery operation when a fault occurs in the computer system, the program to cause a computer to execute a process wherein when a fault occurs in the computer system, of referring to the rule which is previously set in the fault recovery information, and of instructing the computer system, to perform a fault recovery operation corresponding to the fault which occurs and to execute a recovery operation corresponding to the rule.

In the foregoing, a preferable mode is one further causing the computer to execute:

a process, when a fault occurs in a computer system, of storing fault information notified from a fault monitoring agent in the computer system in which the fault occurs in a fault example storage area, and of extracting a feature of a computer system configuration for the fault information;

a process, when the fault occurs in the computer system, of referring to a fault recovery rule including a fault type judging rule for judging which position the fault occurs and what type of the fault and an operation specifying section in which an operation to be executed when a fault occurs, of retrieving a fault type judging rule corresponding to a condition, and of instructing a fault monitoring agent to execute an operation described in a corresponding operation specifying section; and a process of referring to a system configuration rule including a system requisite rule which is a rule of a computer system configuration to met by a computer system to be monitored and an operation specifying section for defining an operation to satisfy the rule, of checking whether all of system requisite rules are met or not, and of instructing the fault monitoring agent to execute an operation described in the operation specifying section corresponding to the system requisite rule when there is non-met system requisite rule.

According to a sixth aspect of the present invention, there is provided a medium storing the program according to the fifth.

With this configuration, following effects can be obtained.

A first effect is that a computer system configuration can be dynamically changed in accordance with a type of a fault which occurs in a computer system.

As its reasons, according to the present invention, fault recovery operations corresponding to various faults are held in the fault monitoring apparatus by using a rule specifying language, and when a fault occurs, the fault monitoring apparatus can instruct any computer system to execute the fault recovery operation corresponding to the fault which occurs.

A second effect is that the fault recovery operation can be executed by taking a computer system configuration into consideration when a fault occurs in the computer system.

As its reasons, according to the present invention, since a rule for recovering the fault is previously set in a rule specifying language, a user can previously define the fault recovery operation by taking the computer system configuration into consideration.

A third effect is that, when the computer system is re-configured for fault recovery, a most effective configuration can be selected.

As its reasons, according to the present invention, component characteristic information is held in the fault monitoring apparatus.

A fourth effect is that it is possible to integrate and manage operations for automatically recovering faults which occur in hardware and software in the computer system.

As its reasons, according to the present invention, since conditions for executing the fault recovery operation and real recovery operations are specified in the rule specifying language, it is possible to define recovery operations for a plurality of faults.

A fifth effect is that, when the fault recovery process is executed, it is possible to automatically select a configuration in a manner that a fault caused by components included in the computer system or a combination of computer systems if possible.

As its reasons, according to the present invention, features of computer system configuration when faults occur are stored in the fault example storage area, and the fault monitoring apparatus updates the component characteristic information so as to avoid a computer system configuration in which a fault is apt to occur.

A sixth effect is that, after executing the automatic fault recovery process, it is possible to change a configuration and an operation of the system by taking system performance and a like into consideration.

As its reasons, according to the present invention, in the system configuration rule to be stored and held in the fault monitoring apparatus, a condition to be met by the system is specified by using the rule specifying language, and an operation to be executed when the condition is not met is defined.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes for carrying out the present invention will be described in further detail using embodiments and examples with reference to the accompanying drawings.

Embodiments

Figure 1:
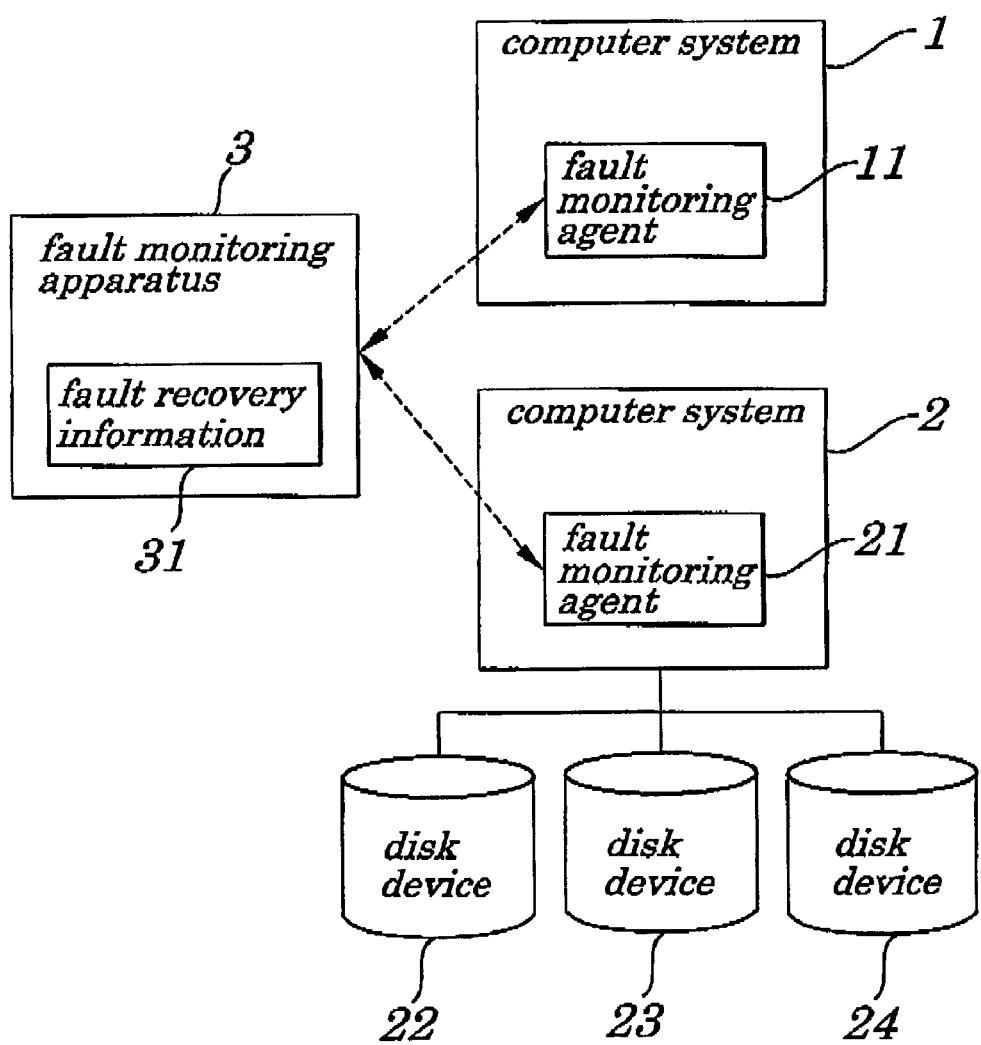
FIG. 1 is a block diagram showing a computer systems configuration according to a first example and a second example of the present invention.

In a computer recovery system according to the present invention, when a fault occurs in some component making up a computer system 1 or a computer system 2, a fault monitoring apparatus 3 shown in FIG. 1 executes a fault recovery process in accordance with a fault recovery operation which is previously defined and stored in the fault monitoring apparatus 3, and in comparison to a conventional computer system having a redundant configuration, a single operation time is especially shortened while a fault occurs. In other words, the fault monitoring apparatus 3 connected to computer systems 1, 2 at the external is used in order to monitor a fault which occurs in a plurality of computer systems 1, 2 and to recover the fault automatically, whereby a flexible automatic fault recovery process is provided and maintenance person-hours for recovery of the fault are minimized.

Also, in the present invention, a feature of computer system configuration in a computer recovery system is extracted when a fault occurs, and therefore, the fault monitoring apparatus 3 can learn a fault caused by a combination of components and can avoid such the combination automatically.

Further, in a computer system in which a plurality of partitions can be provided, the present invention is used, only the components in which faults occur continually are previously prepared plentifully, and it is possible to decide purposes of excess components freely in accordance with the policy of the computer recovery system.

Therefore, it is possible to lower a price of the computer recovery system and to integrate and manage automatic fault recovery processes all over the computer recovery system.

Now, a preferable embodiment of the present invention will be described with reference to drawings. In a computer recovery system according to the preferable embodiment, as shown in FIG. 1, a plurality of the computer system 1, 2 are respectively connected to the fault monitoring apparatus 3 at the external via a network (not labeled) or a like. The computer system 1 and the computer system 2 respectively include a fault monitoring agent 11 and a fault monitoring agent 21. The fault monitoring apparatus 3 communicates with the fault monitoring agent 11 and the fault monitoring agent 21.

The fault monitoring apparatus 3 includes fault recovery information 31. In the fault recovery information 31, rules for determining operations when faults occur in the computer system 1 and the computer system 2 are previously set in a rule specifying language.

In the fault recovery information 31, component characteristic information showing characteristics of components to be each computer system monitored by the fault monitoring apparatus 3.

In the fault recovery information 31, a type of a fault which occurred in past time and computer system configuration information at that time are stored.

In this configuration, for example, when a fault occurs in the computer system 1, the fault monitoring agent 11 in the computer system 1 notifies the fault monitoring apparatus 3 of information concerning the fault which occurs.

When the fault monitoring apparatus 3 receives the fault information, the fault monitoring apparatus 3 refers to the rule (not shown) which is previously set in the fault recovery information 31 and retrieves a fault recovery operation corresponding to the fault which occurs.

The fault monitoring apparatus 3 instructs the fault monitoring agent 11 to execute the fault recovery operation corresponding to a coincided rule. The fault monitoring agent 11 executes an instructed operation.

The fault monitoring apparatus 3 instructs the fault recovery operation in a manner that components included in the computer system 1 are used most efficiently by referring to the component characteristic information.

Also, the fault monitoring apparatus 3 instructs the fault recovery operation in a manner that a computer system configuration in which a fault is apt to occur is avoided by referring to the fault information which occurred in past time and by analyzing faults caused by combinations of components.

In a preferable embodiment of the present invention, the fault recovery information 31 in the fault monitoring apparatus 3 is suitably set in accordance with a tendency of fault in the system, whereby it is possible to provide a flexible automatic recovery process for each of computer systems 1, 2 and to integrate and manage fault-monitoring of a plurality of computer systems 1, 2.

For example, when a fault occurs in an external apparatus connected to the computer system 1, the external apparatus can be disconnected automatically. When a fault occurs in an external apparatus connected to the computer system 2, it is possible to set in a manner that the external apparatus is changed to an alternative apparatus corresponding to the external apparatus automatically.

Also, when the external apparatus is disconnected by the fault recovery operation, there is a possibility in that a demand specification of all the system is not met.

Therefore, in a preferable embodiment of the present invention, a system demand specification is previously set in the fault recovery information 31 in the fault monitoring apparatus 3 by using the rule specifying language, whereby it is possible to further change the computer system configuration after executing the fault recovery operation.

In a preferable embodiment of the present invention, a user sets an operation condition in a case where a fault occurs in a computer system by using the rule specifying language, and the fault monitoring apparatus 3 connected to the fault monitoring apparatus 3 at the outside holds the operation condition. Therefore, when a fault occurs, it is possible to change a system operation and a computer system configuration dynamically in accordance with fault contents, the computer system configuration, the system policy and a like.

Also, in a preferable embodiment of the present invention, it is possible to integrate and manage the fault recovery operation of a plurality of computer systems.

Figure 4:
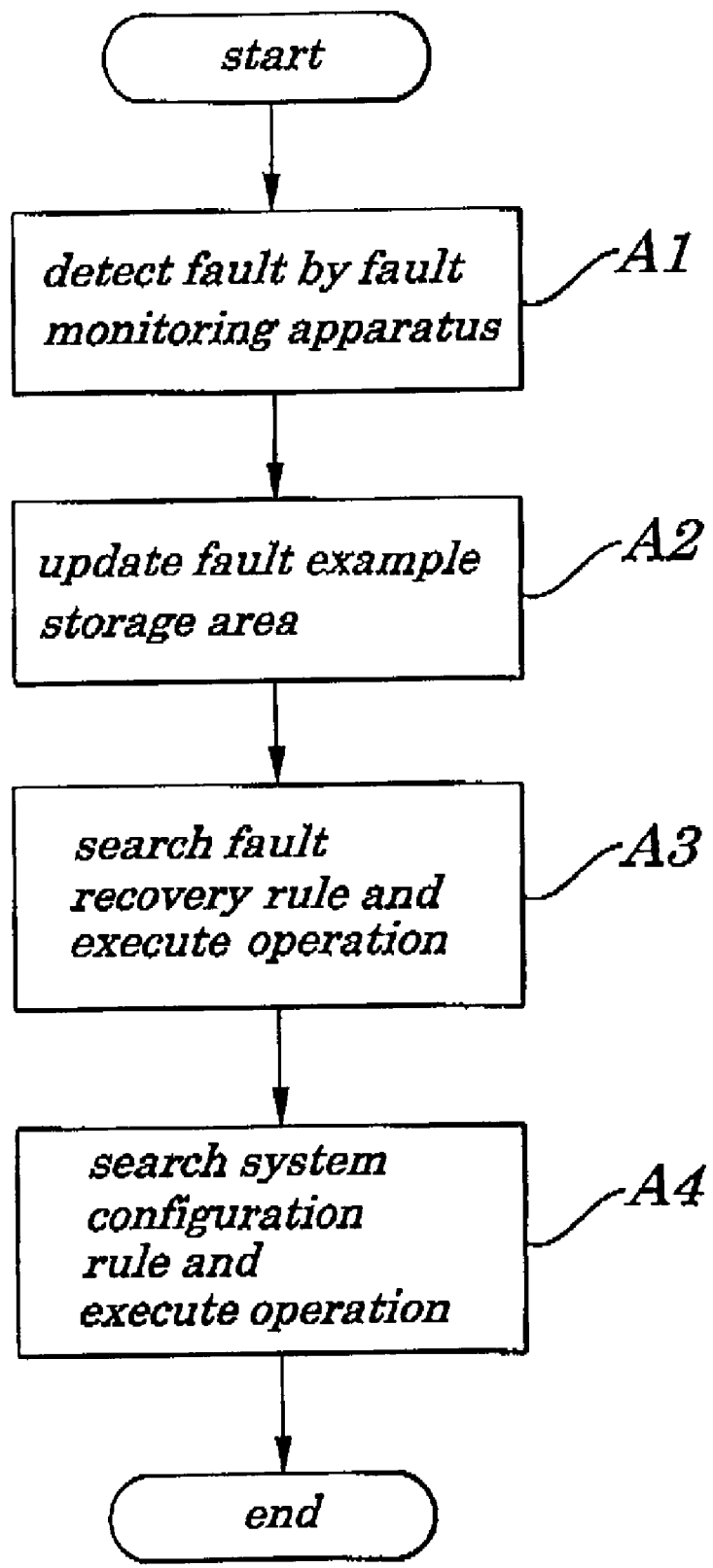
FIG. 4 is a flow chart for explaining an operation according to the first example of the present invention.

A computer recovery method for recovering automatically from a fault according to a preferable embodiment of the present invention includes following steps as shown in FIG. 4.

At Step A1, when a fault occurs in a computer system, a fault monitoring agent in the computer system where the fault occurs notifies the fault monitoring apparatus 3 of the fault occurrence.

At Step A2, the fault monitoring apparatus 3 stores the fault recovery information in a fault example storage area 313 (shown in FIG. 2) and extracts characteristics of the computer system configuration as to the fault information.

At Step A3, the fault monitoring apparatus 3 refers to a fault recovery rule 315 (shown in FIGS. 2 and 3B), retrieves a fault type judging rule 3151 (FIG. 3B) matching to the condition, and instructs the fault monitoring agent to execute the operation described in a corresponding operation specifying section.

At Step A4, the fault monitoring apparatus 3 refers to a system configuration rule 314 (shown in FIGS. 2 and 3A), and checks whether all of system requisite rules 3141 are met or not. When there is a system requisite rule 3141 which is not met, the fault monitoring apparatus 3 instructs the fault monitoring agent to execute the operation described in an operation specifying section 3142 corresponding to the system requisite rule 3141.

Figure 5:
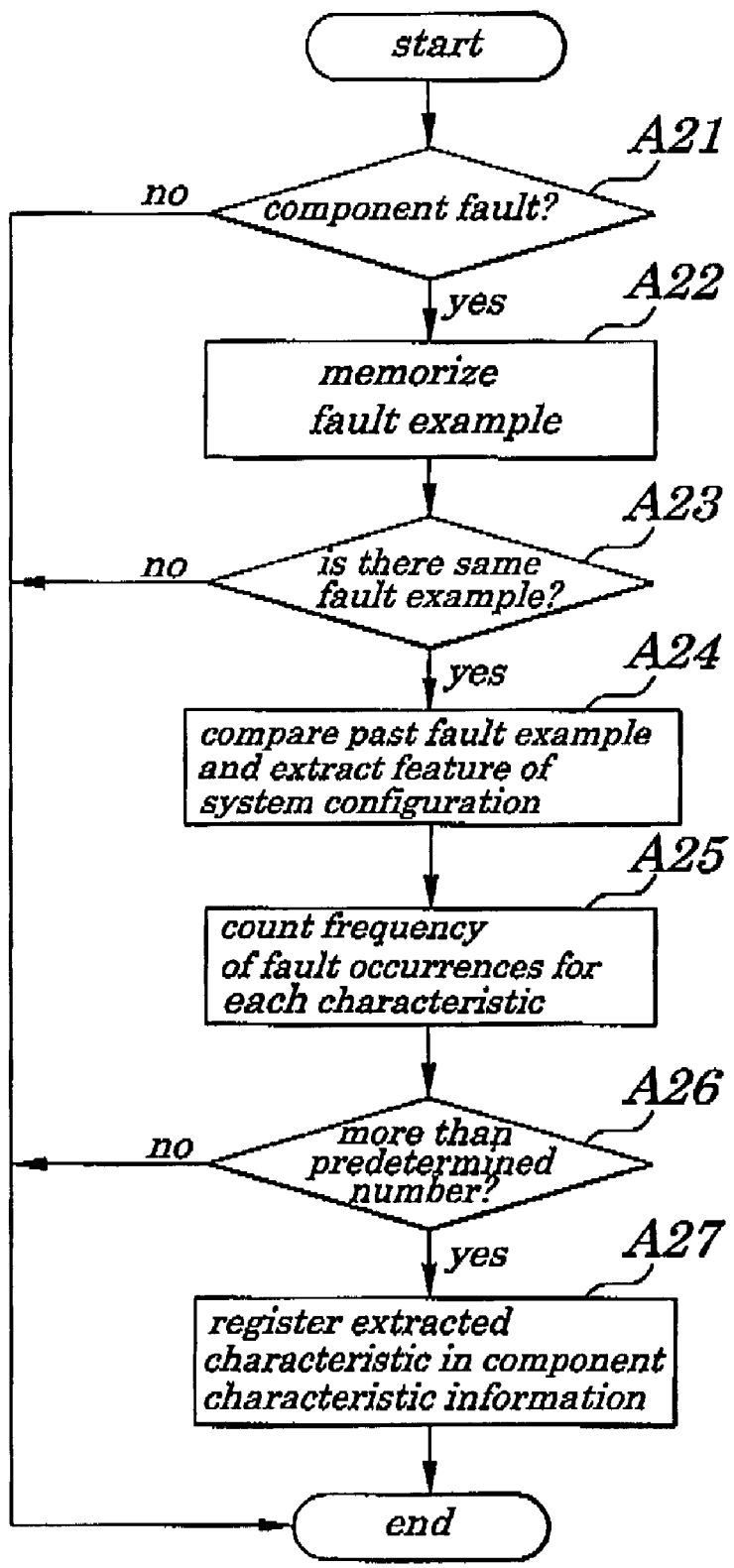
FIG. 5 is a flow chart for explaining details of an updating operation of a fault type storage area (Step A2 in FIG. 4) according to the first example of the present invention.

The Step A2 includes following steps as shown in FIG. 5.

At Step A21, when the fault occurs in the computer system 1, 2, the fault monitoring apparatus 3 checks whether the fault is a component fault or not.

Figure 2:
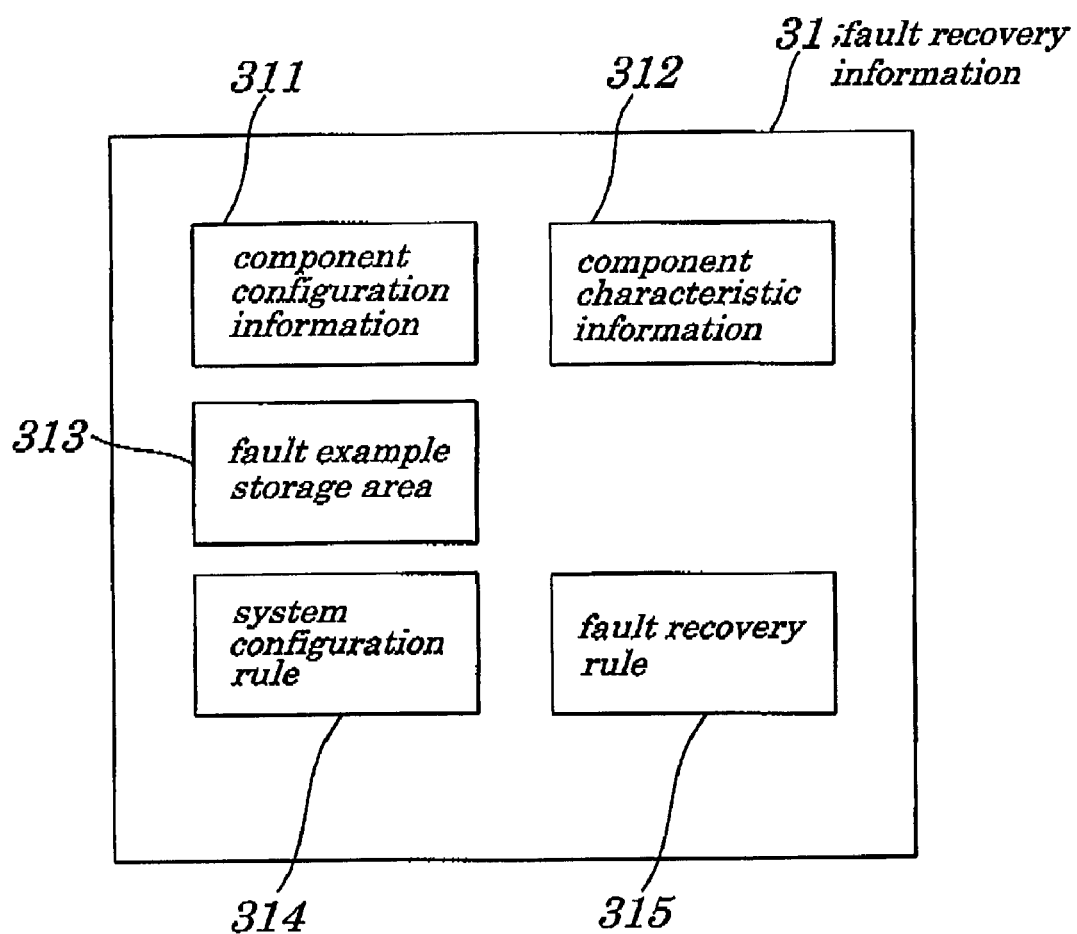
FIG. 2 is a block diagram showing a configuration of fault recovery information according to the first example and the second example of the present invention.

At Step A22, when the component fault occurs, the fault monitoring apparatus 3 stores system configuration information at a time where the component fault occurs in the fault example storage area 313 (shown in FIG. 2).

At Step A23, the fault monitoring apparatus 3 refers to the fault example storage area 313 (shown in FIG. 2) to refer to past fault examples and checks whether there is a same fault example as the fault which occurs this time or not.

At Step A24, when there is the same fault example, the fault monitoring apparatus 3 compares the system configuration information in the same past fault example with the system configuration information in which the fault occurs this time, extracts features of computer system configuration, and stores features of the computer system configuration in the fault example storage area 313 (shown in FIG. 2) so as to be relevant to the fault information.

At Step A25, the fault monitoring apparatus 3 counts a frequency of fault occurrences for every system configuration based on the extracted features of computer system configuration when the fault occurs.

At Step A26, the fault monitoring apparatus 3 checks the frequency of fault occurrences for every feature of computer system configuration.

At Step A27, the fault monitoring apparatus 3 registers a rule for avoiding the extracted feature of computer system configuration in component characteristic information when the frequency of fault occurrences is more than a predetermined number.

Figure 6:
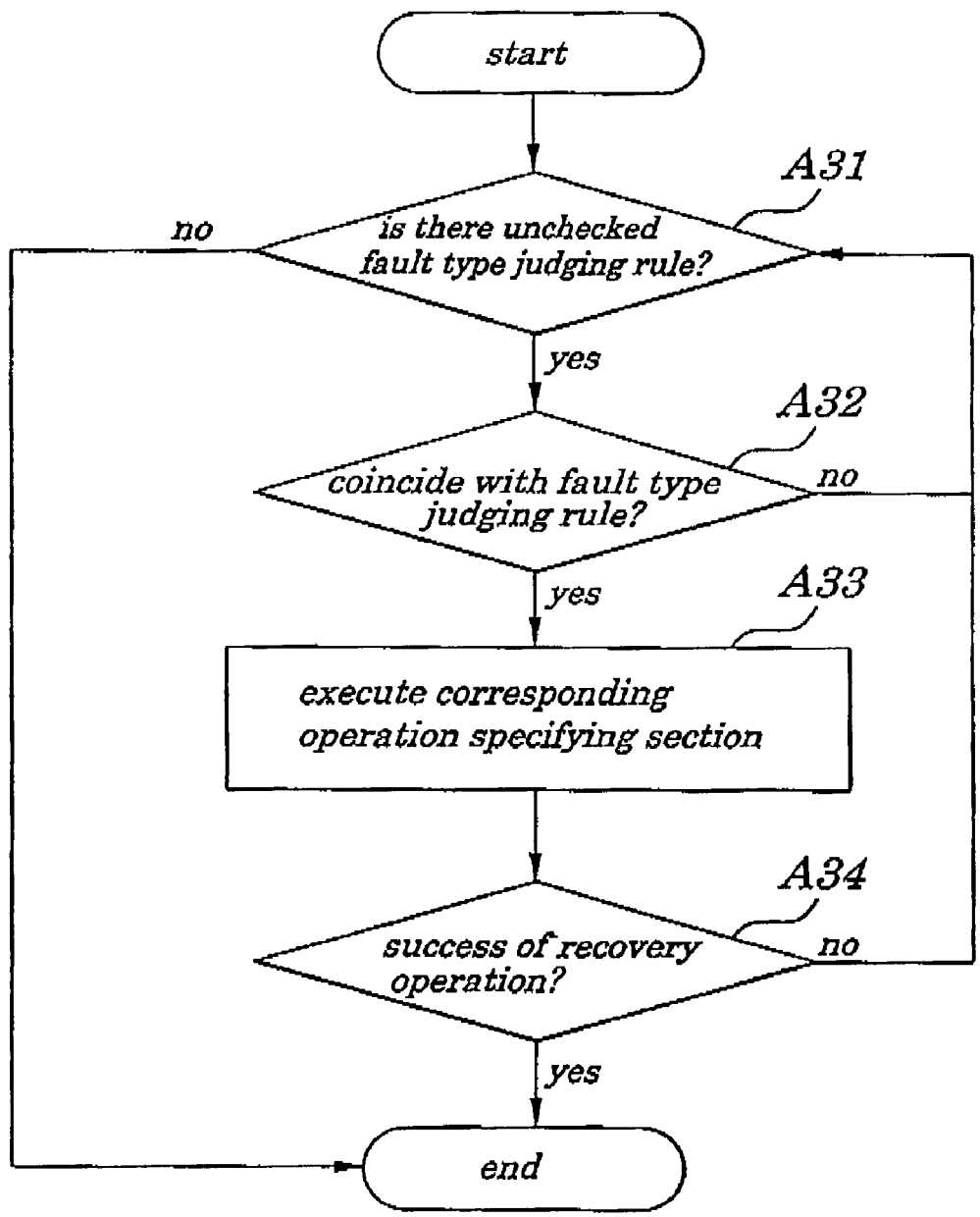
FIG. 6 is a flow chart for explaining details of a search and an operation execution of a fault recovery rule (Step A3 in FIG. 4) according to the first example of the present invention.

The Step A3 includes following steps as shown in FIG. 6.

At Step A31, the fault monitoring apparatus 3 retrieves the fault recovery rule, checks whether there is unchecked fault type judging rule or not, and finishes the process when all of fault types judging rules are checked.

At Step A32, the fault monitoring apparatus 3, when there is an unchecked fault type judging rule, checks whether the fault which occurs coincides with the fault type judging rule or not.

At Step A33, the fault monitoring apparatus 3, when the fault content does not coincide with the fault type judging rule, the process returns to Step A31, and when the fault content coincides with the fault type judging rule, instructs the fault monitoring agent to execute contents of the operation specifying section corresponding to the fault type judging rule which coincides with the fault content.

At Step A34, the fault monitoring apparatus 3 checks whether the instructed operation is executed normally by the fault monitoring agent or not. When the instructed operation is executed normally, the process is finished, and when the instructed operation is not executed normally, the process is returned to Step A31 and the same operation is repeated for the unchecked fault type judging rule.

Figure 7:
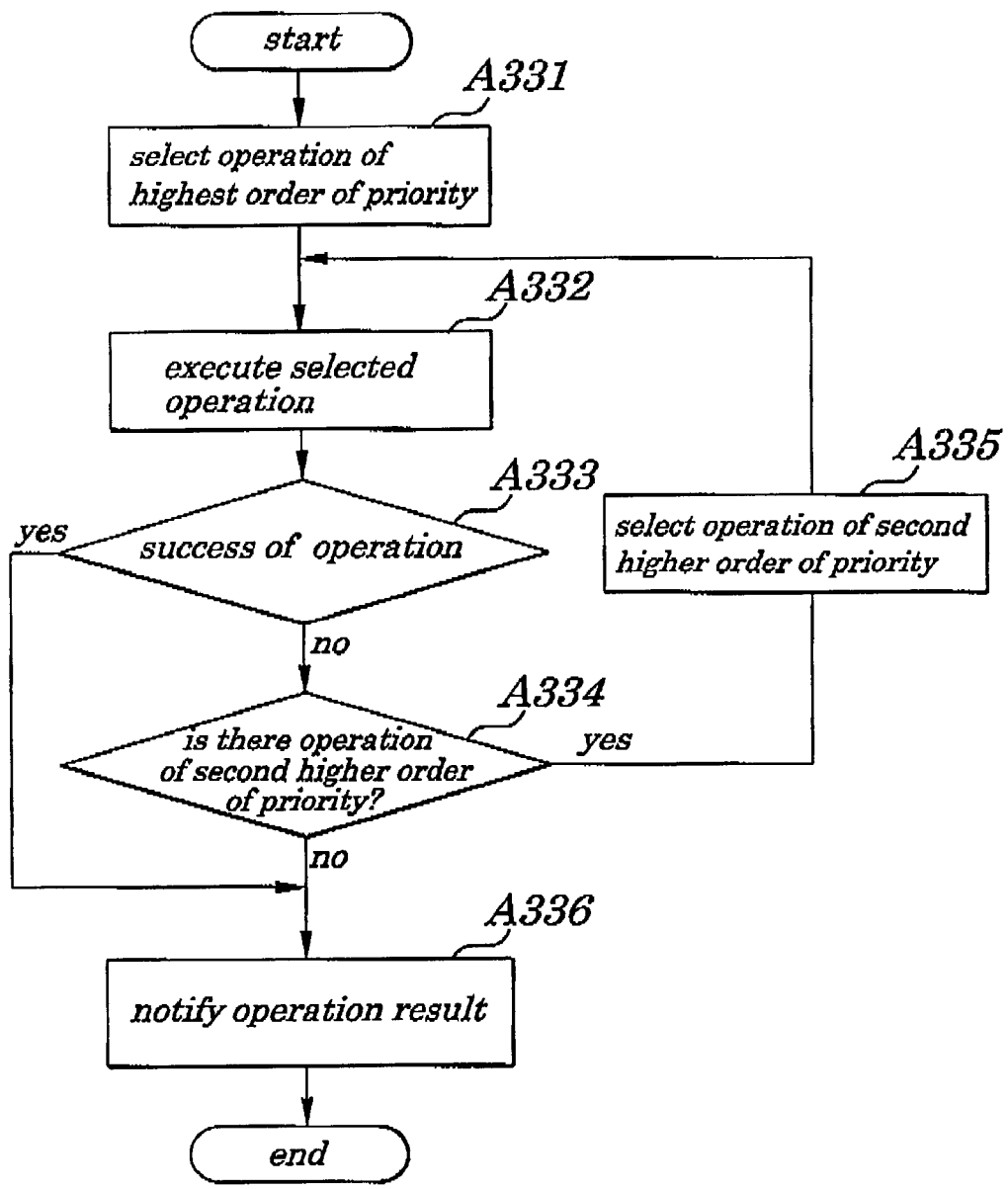
FIG. 7 is a view for explaining an operation according to the first example of the present invention and is a flowchart for explaining details of execution (Step A33) of a corresponding operation specifying section in FIG. 6.

In the fault monitoring apparatus 3, the Step A33 includes following steps as shown in FIG. 7.

At Step A331, the fault monitoring apparatus 3 selects an operation of a highest order of priority among operations described in the operation specifying section.

At Step A332, the fault monitoring apparatus 3 instructs the fault monitoring agent to execute the selected operation.

At Step A333, the fault monitoring apparatus 3 checks whether the selected operation is finished normally or not.

At Step A336, when the selected operation is finished normally, the fault monitoring apparatus 3 notifies a higher process of normal finishing and finishes the process.

At Step A334, the fault monitoring apparatus 3, when the operation fails, checks whether an operation of a second higher priority is defined in the operation specifying section or not. When no operation is defined, the fault monitoring apparatus 3 notifies the higher process that the operation described in the operation specifying section fails and finishes the process.

At Step A335, the fault monitoring apparatus 3, when the operation fails and when the operation of the second higher order of priority is defined in the operation specifying section, selects the operation of the second higher order of priority and returns to Step A332.

Figure 8:
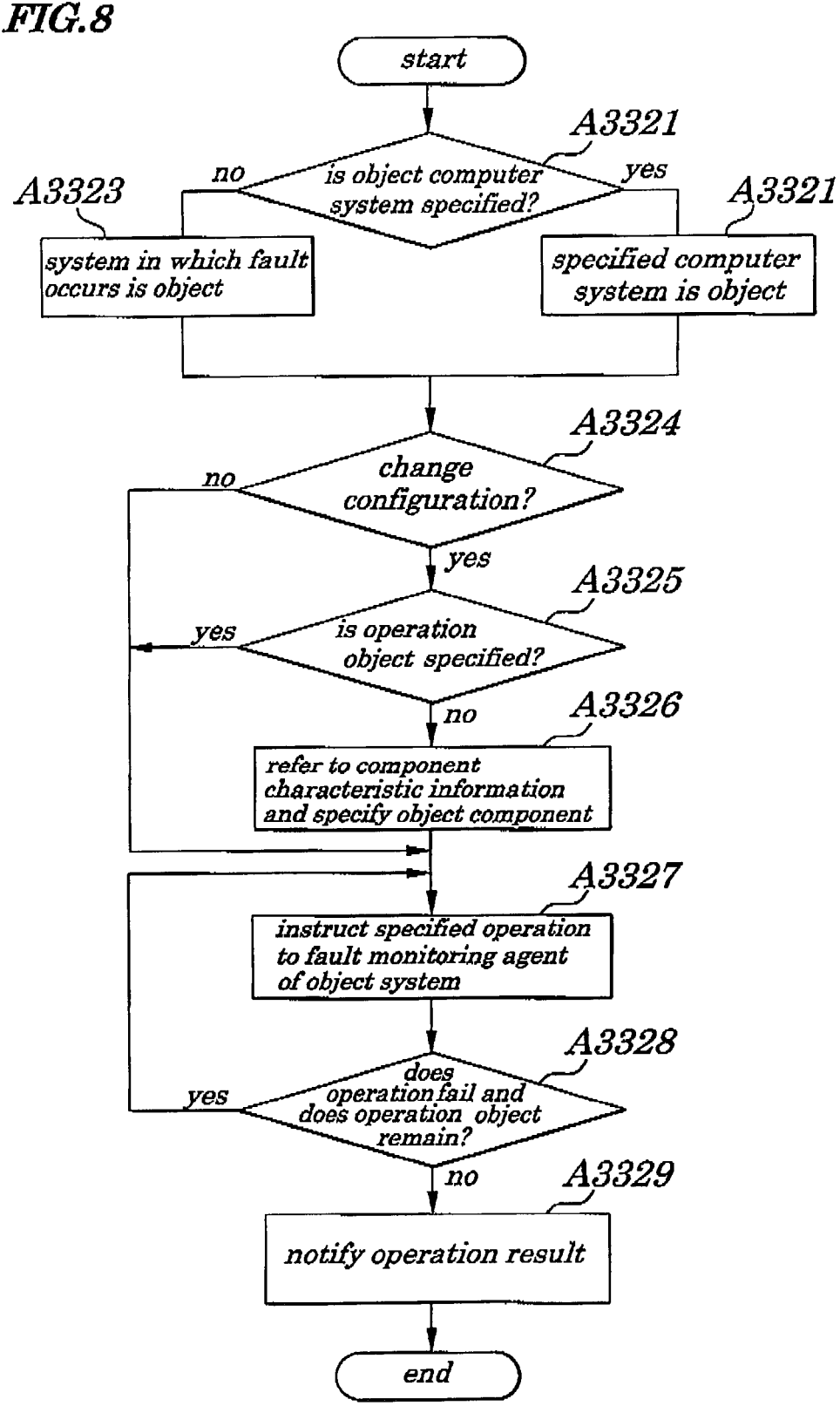
FIG. 8 is a view for explaining an operation according to the first example of the present invention and is a flowchart for explaining details of a selection operation execution step (A332) in FIG. 7.

The Step A332 includes the following steps as shown in FIG. 8.

At Step A3321, the fault monitoring apparatus 3 checks whether the system to be an object of the operation is specified in operation definition or not.

At Step A3322, the fault monitoring apparatus 3, when an object system is specified, sets the specified system as the object system.

At Step A3323, the fault monitoring apparatus 3, when an object system is not specified, sets the system in which the fault occurs as the object system.

At Step A3324, the fault monitoring apparatus 3 checks whether the operation to be executed is to change the computer system, and the process advances to Step A3327 when the operation is not to change the computer system configuration.

At Step A3325, the fault monitoring apparatus 3, when the operation is to change the computer system configuration, checks whether an object component of a configuration change operation is specified or not. When a component to be an object of configuration change is specified, the process is advanced to Step A3327.

At Step A3326, the fault monitoring apparatus 3, when a component to be an object of configuration change is not specified, refers to component characteristic information and decides an object component of a configuration change operation.

At Step A3327, the fault monitoring apparatus 3 instructs the specified operation to the fault monitoring agent 21 in the object system.

At Step A3328, the fault monitoring apparatus 3 checks whether the instructed operation is executed normally or not, notifies the higher process that the operation is successful when the operation is successful, and checks whether the operation object component selected at Step A3326 remains or not when the instructed operation fails. When the operation object component remains, the process returns to Step A3327.

At Step A3329, the fault monitoring apparatus 3, when the operation for all object components fails, notifies the higher process that the operation fails.

Functions of respective steps in the fault monitoring apparatus 3 are carried out by a program executed in a computer of the fault monitoring apparatus 3. The program executed by the computer of the fault monitoring apparatus 3 is stored in a storage medium such as a magnetic disk, a magnetic tape, and an optical disk, is loaded to a storage of the computer of the fault monitoring apparatus 3 via a reading drive unit, a controller and an I/O driver, and is executed.

First Example

Now, further detailed explanations of the first example will be described with reference to FIG. 1. FIG. 1 is a block diagram showing a configuration according to the first example of the present invention. As shown in FIG. 1, the first example of the present invention is provided with the computer system 1 and the computer system 2, and the fault monitoring apparatus 3. The fault apparatus 3 is connected to the computer system 1 and the computer system 2 via a network or a like, and monitors faults which will occur in the computer system 1 and the computer system 2.

The computer system 1 and the computer system 2 respectively include the fault monitoring agent 11 and the fault monitoring agent 21.

Each of the fault monitoring agent 11 and the fault monitoring agent 21 monitors a fault which occurs in each of the computer system 1 and the computer system 2, and when a fault occurs, notifies the fault monitoring apparatus 3 of fault information such as a type of the fault and component information in which the fault occurs.

Also, the fault monitoring agent 11 and the fault monitoring agent 21 can execute any operation instructed from the fault monitoring apparatus 3. For example, the fault monitoring apparatus 3 can instruct the fault monitoring agent 11 to disconnect a specified external apparatus.

The computer system 2 is connected with a disk device 22, a disk device 23 and a disk device 24. Only the disk device 22 among them is occupied, and the disk device 23 and the disk device 24 are connected as backup disk devices.

When the disk device 22 has a fault, the disk device 22 can be automatically changed to the disk device 23 or disk device 24.

Also, it is assumed that there is a performance advantage in that the disk device 24 is connected to the computer system rather than the disk device 23.

The fault monitoring apparatus 3 includes fault recovery information 31. When a fault occurs in the computer system 1 or the computer system 2, the fault monitoring apparatus 3 selects a recovery process based on fault information notified from the fault monitoring agent 11 or the fault monitoring agent 21, and instructs an operation to the fault monitoring agent 11 or the fault monitoring agent 21 in order to try fault recovery.

FIG. 2 is a block diagram showing contents of the fault recovery information 31 included in the fault monitoring apparatus 3 (shown in FIG. 1) according to the first example of the present invention. As shown in FIG. 2, the fault recovery information 31 includes component configuration information 311, component characteristic information 312, a fault example storage area 313, a system configuration rule 314 and a fault recovery rule 315.

As the component configuration information 311, information concerning each component in the computer system 1 and the computer system 2 monitored by the fault monitoring apparatus 3 is set. When one of computer systems 1, 2 becomes monitored as an object to be monitored by the fault monitoring apparatus 3, the fault monitoring apparatus 3 instructs a fault monitoring agent in this computer system to notify information of each component in this computer system and configuration information showing how components are connected or a like. In other words, it is unnecessary for a user to set the component configuration information 311, but the fault monitoring apparatus 3 automatically obtains information of each component from the computer system as an object of monitoring and sets the information as the component configuration information 311.

As the component characteristic information 312, characteristics of each component in the computer system or of each computer system are set, and the component characteristic information 312 is used to arrange a computer system efficiently.

In the component characteristic information 312, as to components in the computer system, occupied components, alternative components which are connectable, and information showing which component is advantageous concerning performance and reliability are set. For example, in the first example, when a fault occurs in the disk device 22 (in FIG. 1) connected to the computer system 2 (in FIG. 1), the disk device 22 is changeable to the disk device 23 or the disk device 24, however, it is assumed that there is a performance advantage by using the disk device 24 rather than disk device 23. In this case, the user previously sets in the component characteristic information 312 by using the rule specifying language that disk devices connectable to the computer system 2 are the disk drive 22, the disk drive 23 and the disk drive 24 and that the disk device 24 has a performance advantage rather than the disk device 23 in the computer system 2.

The fault example storage area 313 stores fault information which generates in the computer system monitored by the fault monitoring apparatus 3. When the fault monitoring apparatus 3 receives the fault information, information of the same fault as the fault which occurs is retrieved from the fault example storage area 313, and features of computer system configuration when the fault occurs, such as a type of a component and a combination of components when the fault occurs are extracted and stored in the fault example storage area 313.

When the fault monitoring apparatus 3, for example, detects a common characteristic for a same fault over a predetermined frequency, it is judged that the computer system configuration is apt to make a fault, and the fault monitoring apparatus 3 sets a rule in the component characteristic information 312 so as to avoid the computer system configuration if possible.

In the system configuration rule 314, a minimum system configuration rule which must be met by the system monitored by the fault monitoring apparatus 3 and an operation for satisfying the rule are set.

In the fault recovery rule 315, a rule for dynamically changing an operation for recovering a fault when the fault occurs in the computer system is set.

Figure 3A:
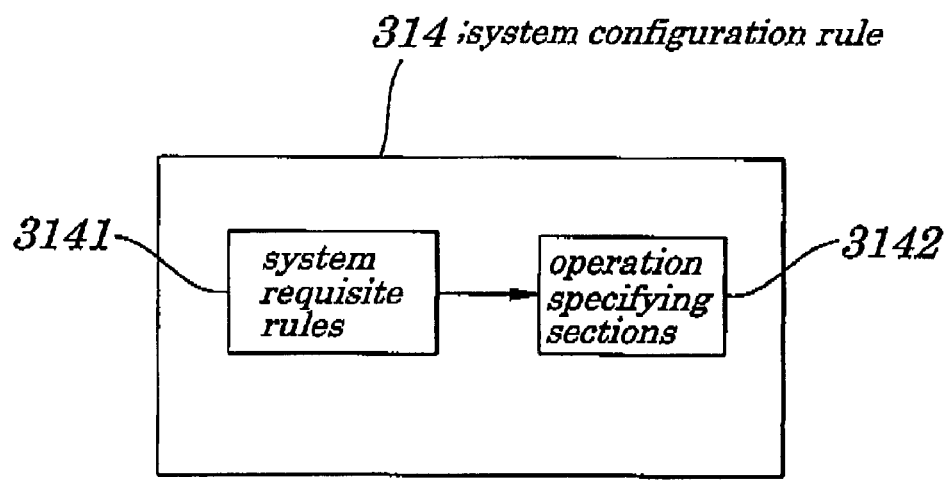
FIG. 3A is a block diagram showing contents of a system configuration rule and FIG. 3B is a block diagram showing contents of a fault recovery rule according to the first example and the second example of the present invention.
Figure 3B:
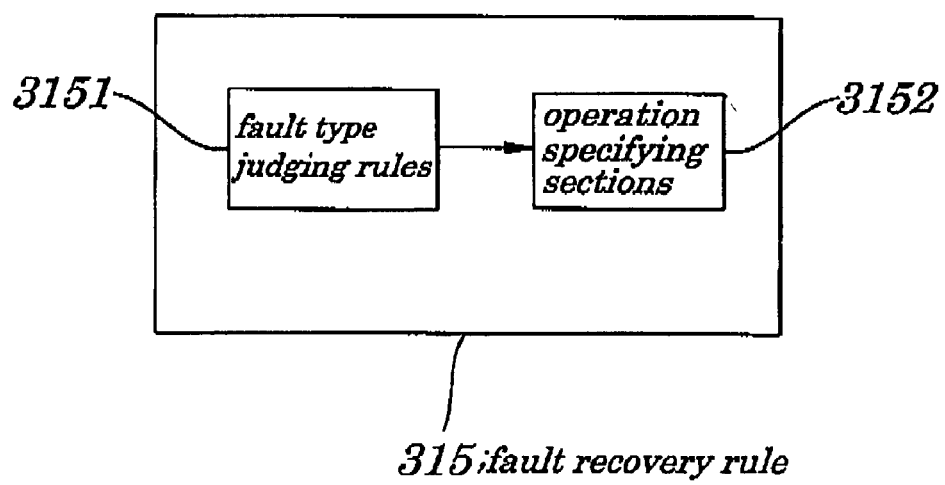

FIG. 3A and FIG. 3B are block diagrams for explaining internal configurations of the system configuration rule 314 and the fault recovery rule 315.

As shown in FIG. 3A, the system configuration rule 314 includes a system requisite rule 3141 and an operation specifying section 3142. The system configuration rule 314 includes a plurality of pairs of system requisite rules 3141 and operation specifying sections 3142. It is unnecessary to provide one operation specifying section 3142 to one system requisite rule 3141 (a one-to-one correspondence), but one operation specifying section 3142 can be obtained to any system requisite rule 3141.

In the system requisite rule 3141, a configuration condition which the computer system monitored by the fault monitoring apparatus 3 must satisfy is described in the rule specifying language. Additionally, any grammar (syntax and construction) or a like of the rule specifying language can be used.

Each system requisite rule 3141 can be specified whether it is used for all of computer systems monitored by the fault monitoring apparatus 3 or it is used for only a specific computer system.

In the operation specifying section 3142, an operation to be executed when a corresponding system requisite rule is not met. It is also possible to specify a plurality of operations in the operation specifying section 3142, and an order of priority is given each operation.

If a fault occurs in the computer system and the recovery operation for the fault is executed, thereafter, the fault monitoring apparatus 3 refers to the system configuration rule 314 and checks whether all of system requisite rules 3141 are met or not.

When the system requisite rule 3141 is not met as a result of the fault recovery operation, the fault monitoring agent 11 is instructed to execute contents described in the operation specifying section 3142 corresponding to the system requisite rule 3141 which is not met.

When the fault monitoring apparatus 3 instructs the operation described in the operation specifying section 3142, first, the fault monitoring apparatus 3 instructs an operation having a first order of priority. When the operation is finished normally, the process is finished.

However, when the operation fails, the fault monitoring apparatus 3 instructs an operation having a second order of priority. For example, information (requisite rule) showing how much of a total of disk device capacities used in the computer system 1 and the computer system 2 is needed at a minimum is specified in the system requisite rule 3141. When the requisite rule is not met, it is possible to specify an operation for adding the standby disk device 23 or the standby disk device 24 which is connected with the computer system 2 to the computer system 2.

As shown in FIG. 3B, the fault recovery rule 315 includes a fault type judging rule 3151 and an operation specifying section 3152.

The fault recovery rule 315 includes a plurality of pairs of fault type judging rules 3151 and operation specifying sections 3152. It is unnecessary to provide one operation specifying section 3152 to one fault type judging rule 3151 (a one-to-one correspondence), but one operation specifying section 3152 can be obtained to any fault type judging 3151.

In the fault type judging rule 3151, a rule for judging where a fault occurs and what type of the fault when the fault occurs is described in the rule specifying language. When a fault occurs in a computer system, information showing a cause is notified from the fault monitoring agent 11 to the fault monitoring apparatus 3.

The fault monitoring apparatus 3 refers to the fault recovery rule 315 and retrieves the fault type judging rules 3151 where the fault which occurs coincides with the condition. Each fault type judging rule 3151 can be specified whether it is used for all of computer systems monitored by the fault monitoring apparatus 3 or it is used for only a specific computer system.

An order of priority is given each fault type judging rule 3151. In retrieving, the fault type judging rules 3151 are searched in order of priority, and the fault type judging rule 3151 which first coincides with the condition is selected.

Further, for an occurrence of a unknown fault, the fault type judging rule 3151 which coincides with all situations and the corresponding operation specifying section 3152 are registered with the lowest order of priority.

In the operation specifying section 3152, an operation to be executed when a fault occurs is specified. It is also possible to specify a plurality of operations in the operation specifying section 3152, and an order of priority is given each operation.

When a fault occurs, the fault monitoring apparatus 3 retrieves for the fault type judging rule 3151 corresponding to the fault which occurs and instructs the operation of contents described in the operation specifying section 3152 corresponding to the fault type judging rule 3151 matching to the fault to the fault monitoring agent 11.

When the fault monitoring apparatus 3 instructs the operation described in the operation specifying section 3152, first, the fault monitoring apparatus 3 instructs an operation having a first priority. When the operation is finished normally, the process is finished. However, when the operation fails, the fault monitoring apparatus 3 instructs an operation having a second order of priority.

In the operation specifying section 3152, an operation can be specified by designating a specific apparatus or an operation can be specified without designating an apparatus.

For example, as shown in FIG. 1, when a fault occurs in the disk device 22 connected to the computer system 2, it is possible to instruct to change the disk device 22 to the disk device 23 or to change the disk device 22 to one of alternative components.

When the operation described in the operation specifying section 3152 fails, it is considered that the corresponding fault type judging rule does not coincide with the condition, and search of the fault type judging rule 3151 is continued.

FIG. 4 is a flowchart for explaining the operation of the first example. The operation when a fault occurs according to the first example will be explained with reference to FIG. 1 to FIG. 4.

First, at Step A1, the fault monitoring apparatus 3 detects a fault in the computer system to be monitored. A fault monitoring agent 11 in the computer system where the fault occurs notifies the fault monitoring apparatus 3 of fault information such as the computer system where the fault occurs, a type of the fault and component information where the fault occurs.

At Step A2, the fault monitoring apparatus 3 stores the fault information in a fault example storage area 313 and extracts characteristics of the computer system configuration as to the fault information.

At Step A3, the fault monitoring apparatus 3 refers to the fault recovery rule 315 (see FIG. 3B), retrieves for the fault type judging rule 3151 matching to the condition, and instructs the fault monitoring agent 11 to execute the operation described in a corresponding operation specifying section 3152.

At Step A4, the fault monitoring apparatus 3 refers to a system configuration rule 314 (see in FIG. 3A), checks whether all of system requisite rules 3141 are met or not. When there is a system requisite rule 3141 which is not met, the fault monitoring apparatus 3 instructs the fault monitoring agent 11 to execute the operation described in an operation specifying section 3142 corresponding to the system requisite rule 3141.

FIG. 5 is a flowchart for explaining detailed operations of Step A2 in FIG. 4. As shown in FIG. 5, at Step A21, the fault monitoring apparatus 3 checks whether the fault which occurs this time is a component fault or not.

When the fault is not a component fault, for example, a fault occurs caused by detecting a logical discrepancy in the operating system, the fault monitoring apparatus 3 considers that the fault occurs not caused by the computer system configuration, and the process is finished (branch to NO at Step A21).

When the component fault occurs, at Step A22, the fault monitoring apparatus 3 stores system configuration information at a time where the component fault occurs in the fault example storage area 313 and executes Step A23.

At Step A23, the fault monitoring apparatus 3 refers to past fault examples and checks whether there is a same fault example as the fault which occurs this time or not. When there is no same fault example, there are no judging materials as to features of computer system configuration, and therefore, the process is finished (branch to NO at Step A23).

When there is the same fault example at Step A23, the process is advanced to Step A24. The fault monitoring apparatus 3 compares the system configuration information in the same past fault example with the system configuration information in which the fault occurs this time, extracts features of computer system configuration, and stores the features of computer system configuration in the fault example storage area 313 so as to be relevant to the fault information.

For example, in FIG. 1, explanations will be given while it is assumed that a fault occurs in the disk device 22 connected to the computer system 2. In this case, the fault monitoring apparatus 3 refers to fault examples relative to the faults in the disk device 22, and judges whether the fault occurs only when the disk device 22 is connected to a specific position or when the disk device 22 is connected to any position.

In the past fault examples corresponding to the fault, when there are remarkable many pieces of system configuration information in which the disk device 22 is connected to the specific position, information of the disk device 22 and a connection position is extracted as a characteristic.

In the past fault examples corresponding to the fault, when there is system configuration information in which the disk device 22 is connected to various positions, information of the disk device 22 is extracted as a characteristic.

After extracting the characteristic, at Step A25, the fault monitoring apparatus 3 counts a frequency of fault occurrences for every feature of computer system configuration when the fault occurs.

At Step A26, the fault monitoring apparatus 3 checks the frequency of fault occurrences for every feature of computer system configuration. When the frequency of fault occurrences is less than a predetermined number, the process is finished.

When the frequency of fault occurrences is not less than a predetermined number, at Step A27, the fault monitoring apparatus 3 resisters a rule for avoiding the extracted feature of computer system configuration in component characteristic information 312, and the process is finished.

For example, when information of the disk device 22 in FIG. 1 and the connection position is extracted as a characteristic, the fault monitoring apparatus 3 produces a rule for avoiding to connect the disk device 22 to the connection position if possible by using the rule specifying language and registers the rule in the component characteristic information.

With these processes, when component faults often occur cased by a combination of specific components, a rule for avoiding the combination is automatically registered in the component characteristic information 312.

FIG. 6 is a flowchart for explaining detailed operations of Step A3 in FIG. 4. At Step A31 in FIG. 6, it is checked whether there is an unchecked fault type judging rule or not. At this time, this check is executed in order of priority allocated to each fault type judging rule 3151. When all of the fault type judging rules 3151 are checked, the process is finished. When there is an unchecked fault type judging rule 3151, Step A32 is executed.

At Step A32, it is checked whether the fault which occurs coincides with the fault type judging rule 3151 or not.

As the fault type judging rule 3151, a rule showing a computer system where a fault occurs, a component where a fault occurs, a type of the fault, and a like is described in the rule specifying language.

When the fault content does not coincide with the fault type judging rules 3151, the processes from Step A31 are repeated. When there is the fault type judging rule 3151 coinciding with the fault content, Step A33 is executed.

At Step A33, the fault monitoring agent 11 is instructed to execute contents of the operation specifying section 3152 corresponding to the fault judging rule 3151 which coincides with the fault content. It is possible to specify a specific computer system for each operation described in the operation specifying section 3152.

When no computer system is specified for the operation described in the operation specifying section 3152, the system where the fault occurs is specified.

The fault monitoring apparatus 3 instructs the fault monitoring agent 11 in the specified computer system to execute the operation described in the operation specifying sections 3152.

At Step A34, the fault monitoring apparatus 3 checks whether the instructed operation is executed normally by the fault monitoring agent 11 or not. When the instructed operation is executed normally, the process is finished, and when the instructed operation is not executed normally caused by any reason, the process is returned to Step A31 and the same operation is repeated for the unchecked fault type judging rules 3151.

In other words, when the instructed operation is not executed normally by the fault monitoring agent 11, it is considered that the condition does not coincide with the fault type judging rules 3151.

At Step A31, when there is no unchecked fault type judging rule 3151, the process is finished.

FIG. 7 is a flowchart for explaining detailed operations of Step A33 in FIG. 6. As shown in FIG. 7, at Step A331, an operation of a highest order of priority is selected among operations described in the operation specifying sections 3152.

At Step A332, the fault monitoring apparatus 3 instructs the fault monitoring agent 11 to execute the selected operation.

At Step A333, the fault monitoring apparatus 3 checks whether the selected operation is finished normally or not.

When the selected operation is finished normally (branch to YES at Step A333), at step A336, the fault monitoring apparatus 3 notifies a higher process (not shown) that the operation described in the operation specifying section 3152 is normally finished and finishes the process.

When the operation fails (branch to NO at Step A333), at Step A334, it is checked whether an operation of a second higher order of priority is defined in the operation specifying section 3152 or not.

When no operation is defined, at step A336, it is notified that the operation described in the operation specifying section 3152 fails to the higher process and the process is finished.

When the operation of the second higher order of priority is defined, at Step A335, the operation of the second higher order of priority is selected and the processes from Step A332 are repeated.

FIG. 8 is a flowchart for explaining the operation of Step A332 in FIG. 7. At Step A3321, it is checked whether the system to be an object of operation is specified in operation definition or not.

When an object system is specified, at Step A3322, the specified system becomes the object system. When no object system is specified, the system where the fault occurs at Step A3323 becomes an object system.

An example will be explained with reference to FIG. 1. When the computer system 2 is specified as an object system of an operation in an operation definition, though a recovery operation is for the fault in the computer system, the object system is the computer system 2.

For example, when a fault occurs in the computer system 1 in FIG. 1, automatic recovery of the computer system 1 is abandoned, resources such as CPU and a disk device are added to the computer system 2, whereby it is possible to define an operation for trying system recovery.

When no object system is specified in operation definition and the operation is a recovery operation for the fault in the computer system 1, the computer system 1 is the object system. After specifying the object system, the process is advanced to Step A3324.

At Step A3324, it is checked whether the operation to be executed is to change the computer system.

For example, when the computer system configuration is not changed such as restarting the computer system where the fault occurs, the process advances to Step A3327.

When the operation is to change the computer system configuration such as changing a component where a fault occurs, the process advances to Step A3325.

At Step A3325, it is checked whether an object component of a configuration change operation is specified or not. An example will be explained with reference to FIG. 1. When a component to be an object for configuration change is specified such as changing the disk device 22 to the disk device 24, the process advances to Step A3327.

When no component to be an object of configuration change is specified such as changing the disk device 22 to any changeable disk device, the process is advanced to Step A3326.

At Step A3326, the component characteristic information 312 is referred and an object component of a configuration change operation is decided.

In the first example, a characteristic that disk devices changeable from the disk device 22 are the disk device 23 and the disk device 24, and another characteristic is that the performance of the disk device 24 is better than that of the disk device 23 are previously set in the component characteristic information 312.

When the operation for changing the disk device 22 to any changeable disk devices 23, 24 are executed, by referring to the component characteristic information 312, it is understood that changeable disk devices are the disk device 23 and the disk device 24.

Also, since it is understood that the performance of the disk device 24 is better, the disk device 24 and the disk device 23 are selected as object components, it is set that change to the disk device 24 is first tried, and then the process advances to Step A3327.

Also, in defining operations such as component change, and component isolation, when no component to be changed or to be isolated is defined in the operation definition, the component where the fault is detected is an object for change or isolation.

At Step A3327, the specified operation is instructed to the fault monitoring agent 11 in the object system which is specified.

At Step A3328, it is checked whether the instructed operation is executed normally or not.

When the instructed operation is executed normally, the process advances to Step A3329, and it is notified the higher process that the operation is successful.

When the instructed operation fails, it is checked whether the operation object component selected at Step A3326 remains or not. For example, when the disk device 22 fails to change to the disk device 24, the disk device 23 remains as the object component. In this case, the process returns to Step A3327, and the disk device 22 is tried to change to the disk device 23.

When the operation for all object components fails, the process advances to Step A3329, it is notified the higher process that the operation fails.

Since orders of priorities are given to each fault type judging rule 3151 and each operation specifying section 3152 (FIG. 3), it is possible to set a recovery operation for a fault which occurs flexibly.

Figure 9:
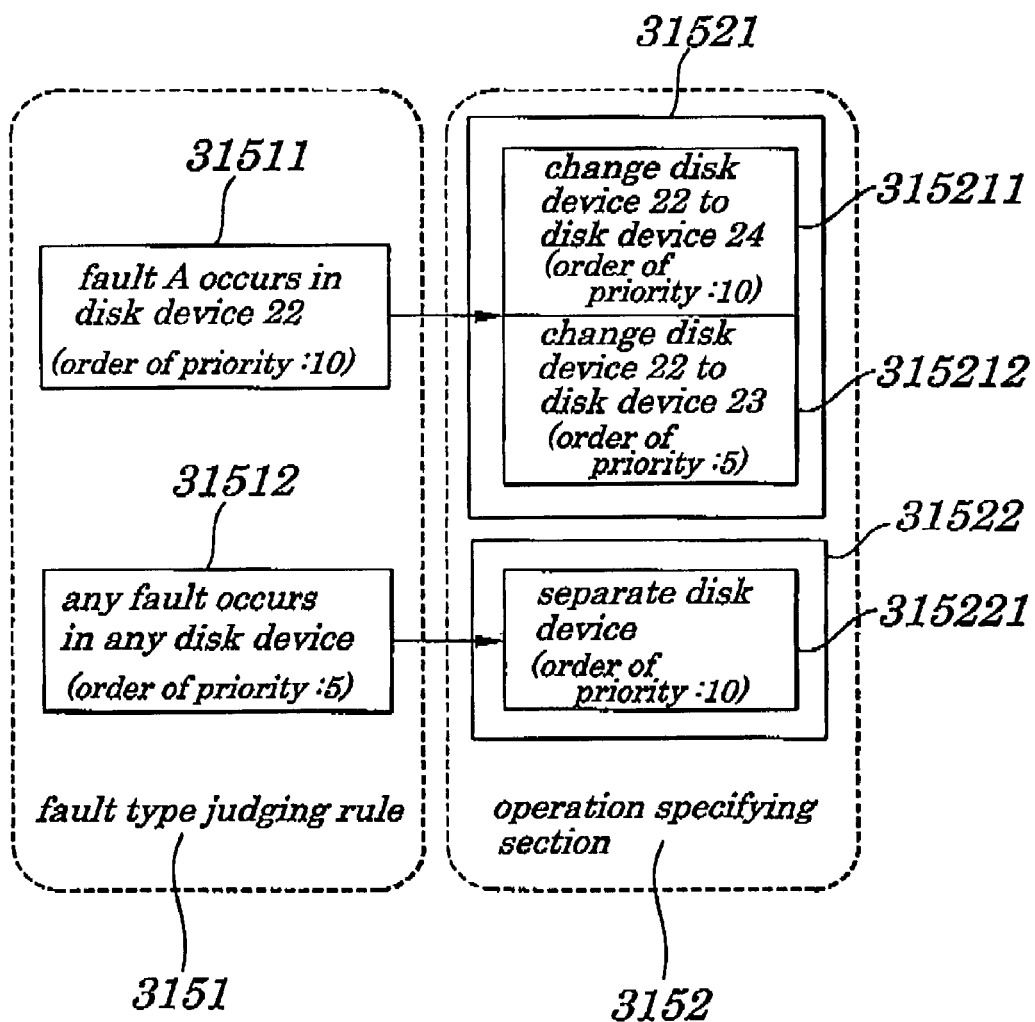
FIG. 9 is a block diagram showing an example of a fault type judging rule and the operation specifying section.

FIG. 9 is a block diagram for explaining one example of fault recovery operation specifying by using the order of priority according to the first example of the present invention. FIG. 9 shows one example of setting the fault type judging rule 3151 and the operation specifying section 3152 for the disk device 22 connected to the computer system 2 shown in FIG. 1.

A fault type judging rule 31511 is a rule showing a condition in which a fault A occurs in the disk device 22.

A fault type judging rule 31512 is a rule showing a condition in which any fault occurs in any disk device.

An order of priority of ten is given to the fault type judging rule 31511, and an order of priority of five is given to the fault type judging rule 31512. The larger the value of the order of priority is set, the higher the order of priority is set. The fault monitoring apparatus 3 checks fault type judging rule in higher order of priority.

Also, the fault type judging rule 31511 and the fault type judging rule 31512 respectively correspond to an operation specifying section 31521 and an operation specifying section 31522.

In the operation specifying section 31521, an operation 315211 and an operation 315212 are described, and an order of priority of ten and an order of priority of five are respectively given.

In the operation specifying section 31522, an operation 315221 is described, and an order of priority of ten is given. The larger the value of the order of priority is set, the higher the order of priority is set. When the operation in the operation specifying section is executed, the fault monitoring apparatus 3 tries to execute the operation having the higher order of priority.

The operation 315211 is described to execute the operation of changing the disk device 22 to the disk device 24.

The operation 315212 is described to execute the operation of changing the disk device 22 to the disk device 23.

The operation 315221 is described to execute the operation of separating the disk device in which a fault occurs.

Also, in each operation, the computer system 2 is specified as an object system.

When a fault A occurs in the disk device 22 connected to the computer system 2 shown in FIG. 1, first, the fault type judging rule 31511 is selected as a rule matching to a condition, and the content of the operation specifying section 31521 is executed.

In the operation specifying section 31521, two operations 315211, 315212 are specified. Since the operation 315211 has the highest order of priority, first, the fault monitoring agent 21 in the computer system 2 is instructed to change the disk device 22 to the disk device 24. When change of the disk device 22 to the disk device 24 is successful, the process is finished.

When the change of the disk device 22 to the disk device 24 fails for any reason, the content of the operation 315212 having the second higher order of priority is executed. Therefore, the fault monitoring agent 21 in the computer system 2 is instructed to change the disk device 22 to the disk device 23. When change of the disk device 22 to the disk device 23 is successful, the process is finished.

When the change of the disk device 22 to the disk device 23 fails caused for reason, all operations described in the operation specifying section 31521 fail. Therefore, it is considered that the fault type judging rule 31511 does not match to the condition, and then the fault type judging rule 31512 is selected.

Therefore, the content of the operation specifying section 31522 corresponding to the fault type judging rule 31512 is executed.

Since there is one operation in the operation specifying section 31522, the fault monitoring agent 21 in the computer system 2 is instructed to disconnect the disk device 22 in accordance with the content of the operation 315221.

As described above, by using the fault type judging rule and the order of priority for the operations, it is possible to specify a plurality of recovery processes for a same fault.

Figure 10:
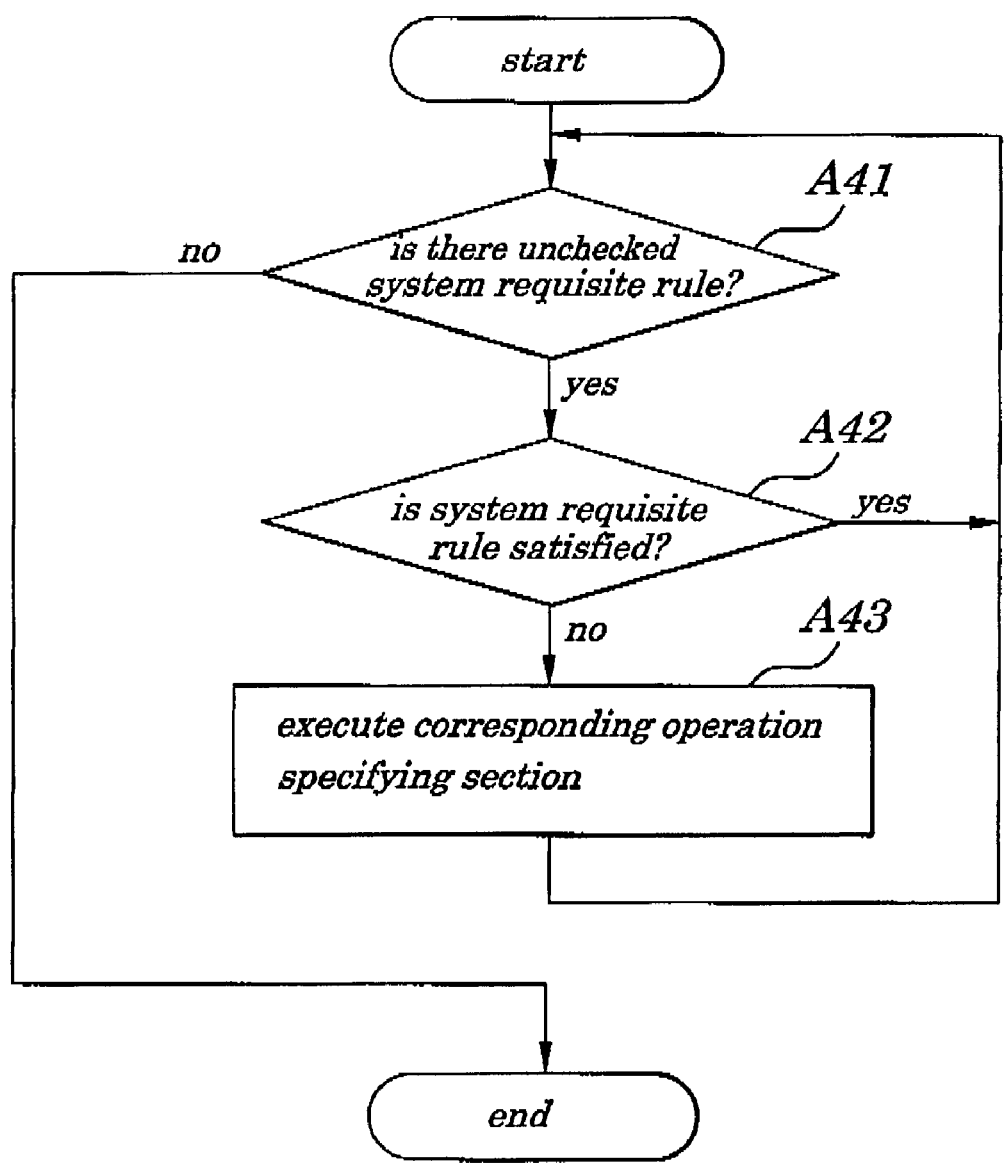
FIG. 10 is a flow chart for explaining details of search and operation execution of a system configuration rule (Step A4 in FIG. 4) according to the first example of the present invention.

FIG. 10 is a flowchart for explaining operation contents of Step A4 in FIG. 4. At step A41, it is checked whether there is an unchecked system requisite rule or not. When there is an unchecked system requisite rule, the process advances to Step A42, and it is checked whether the system requisite rule is met or not.

When the system requisite rule is met, the processes from Step A41 are repeated.

When the system requisite rule is not met, at Step A43, the content corresponding to the operation specifying section is executed, and the processes from Step A41 are repeated. Additionally, the process at Step A43 is similar to the process for executing the specifying section corresponding to the fault type judging rule.

Second Example

A second example of the present invention will be described. When a fault type judging rule 3151 shown in FIG. 3B is used to judge states except faults, there is an advantage for reducing maintenance person-hours for a computer system. For example, each fault monitoring agent in each computer system reports each of operating system load information to a fault monitoring apparatus 3 (shown in FIG. 1) regularly.

In the fault monitoring apparatus 3, a condition in which a load of an operating system exceeds a value is previously registered as the fault type judging rule 3151, and an operation that a CPU board is added to a corresponding computer system is defined as a corresponding fault recovery operation.

In this configuration, when the load of the operating system is over the value, the CPU is added to the operating system automatically, and the load of the operating system is reduced.

As described above, a state except the fault is registered in the fault recovery rule 315, whereby it is possible to change a system configuration automatically in accordance with a system state.

The present invention is also available to a cluster system. When the cluster system including a plurality of nodes, a fault monitoring apparatus for managing the cluster system is prepared, fault recovery information is held by the fault monitoring apparatus, and a fault monitoring agent is operated in each node.

In a component configuration 311 in FIG. 2, the fault monitoring apparatus 3 (FIG. 1) sets information of each node.

In the component characteristic information 312, it is set that each node can make a cluster with which node.

Also, when communication speeds between nodes are different caused by a network configuration or a like, that information is set in the component characteristic information 312.

Fault recovery operations corresponding to various faults are set in the fault recovery rule 315, whereby it is possible to change a cluster configuration dynamically and efficiently when a fault occurs.

When faults occur often between nodes in the cluster caused by a network fault or a like, the configuration is stored in a fault example storage area 313, and the fault monitoring apparatus 3 updates component characteristic information automatically in order to avoid the cluster configuration in which faults between nodes occur often.

Also, when it is expected that a system performance lowers as a result of executing the automatic fault recovery process, the system configuration rule is defined suitably, whereby it is possible to execute a process for adding a new node automatically.

Third Example

Figure 11:
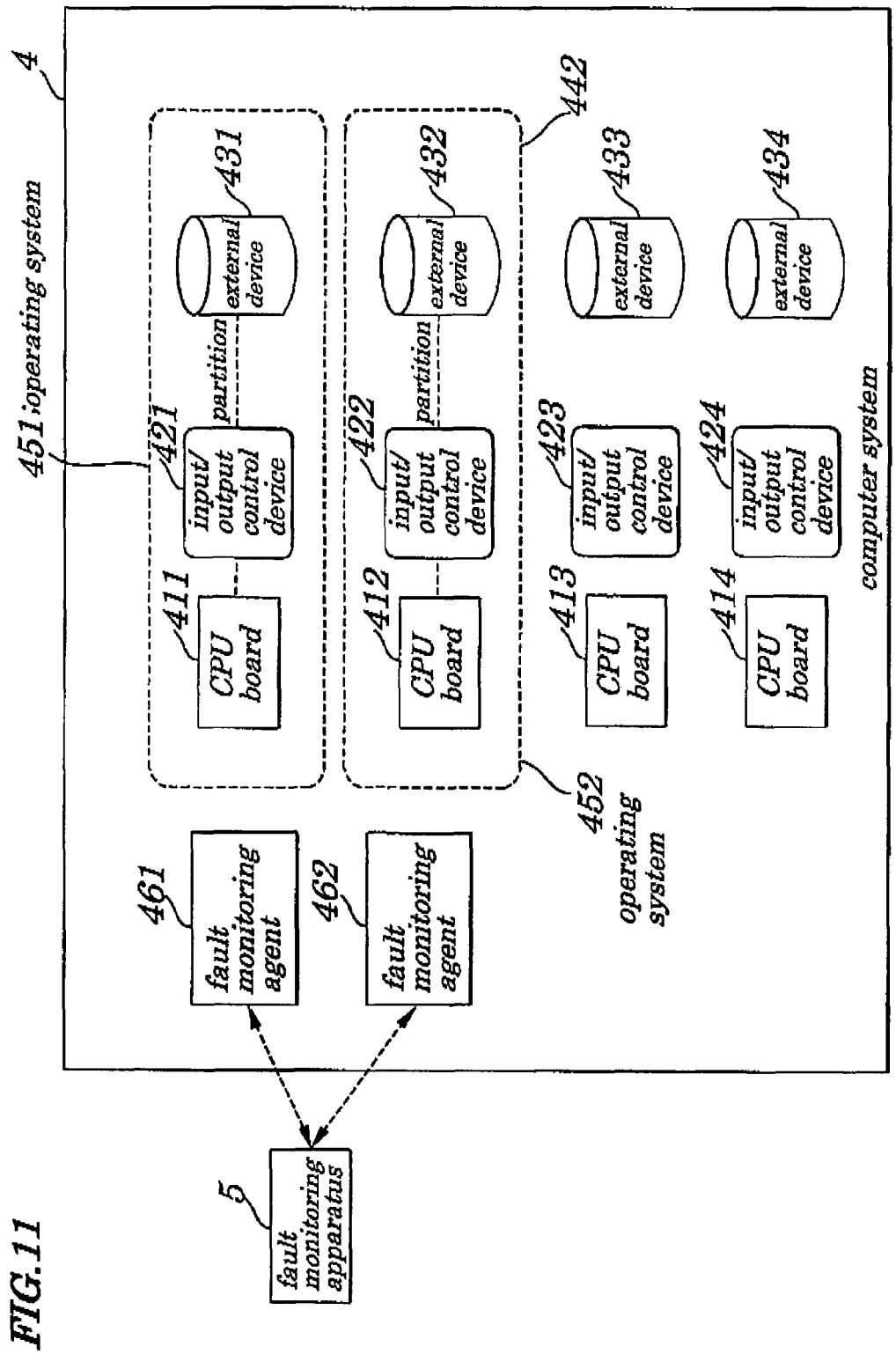
FIG. 11 is a block diagram showing a configuration according to a third example of the present invention.

FIG. 11 is a block diagram showing a configuration according to the third example of the present invention. The third example of the present invention will be explained with reference to FIG. 11. As shown in FIG. 11, a computer system 4 includes a plurality of CPU boards 411, 412, 413, and 414, a plurality of input/output control devices 421, 422, 423, and 424, and a plurality of external storage devices 431, 432, 433, and 434. It is possible to configure a plurality of sub-computer systems inside by combining these suitably.

The sub-computer systems are called partitions, and each operating system can act independently in each partition.

Also, a fault monitoring apparatus 5 is connected to the computer system 4 via a network (not shown) or a like, and the fault monitoring apparatus 5 monitors a fault in the computer system 4.

In FIG. 11, the CPU board 411, the input/output control device 421 and the external device (such as an external storage device) 431 make the partition 441, and an operating system 451 acts in the partition 441.

The CPU board 412, the input/output control device 422 and the external device (such as an external storage device) 432 make the partition 442, and an operating system 452 acts in the partition 442.

A fault monitoring agent 461 and a fault monitoring agent 462 act in the computer system 4, and can communicate with the fault monitoring apparatus 5.

The fault monitoring agent 461 manages the partition 441, and the fault monitoring agent 462 manages the partition 442.

The CPU board 413 and the CPU board 414, the input/output device 423, and the input/output device 424, and the external device 433, and the external device 434 are not used.

In the computer system 4, it is possible to change partitions when the system acts. Also, the input/output control device 421, the input/output control device 422, the input/output control device 423 and the input/output control device 424, and the external device 431, the external device 432, the external device 433 and the external device 434 are connected via a high-speed network, and any input/output control device and any external device can be connected dynamically.

The present invention is available to a computer system in which a plurality of partitions can be arranged and the configuration can be dynamically changed, such as the computer system 4 as shown in FIG. 11. The CPU board 413 and the CPU board 414, the input/output control device 423 and the input/output control device 424, and the external device 433 and the external device 434 are defined as spare components in a component characteristic information 312 (shown in FIG. 2), and a fault type judging rule 3151 and an operation specifying section 3152 (shown in FIG. 3) are set, whereby when a component in the partition 441 and the partition 442 has a fault, it is set that the component is changed to an alternative component automatically.

Also, it is possible for the fault monitoring apparatus 5 to define each fault type judging rule and each operation specifying section for each computer system, and therefore, though the operating system 451 is different from the operating system 452, it is possible to integrate and manage the automatic fault recovery operation by the fault monitoring apparatus 5.

For example, it is assumed that the operating system 451 can change the input/output control device while the system acts but the operating system 452 can not change the input/output control device while the system acts, and must stop the system once.

When a fault occurs in the input/output control device 421 used by the operating system 451, the input/output control device 421 can be changed to the input/output control device 423 or the input/output control device 424 while the system acts. Therefore, it is possible to set a definition in which when a fault occurs in the input/output control device 421 used by the operating system 451, the input/output control device 421 is changed to an alternative component and the external device 431 used by the operating system 451 is connected to the alternative component while the system acts.

When a fault occurs in the input/output control device 422 used by the operating system 452, the operating system 452 must be stopped once. Therefore, it is possible to set a definition in which when a fault occurs in the input/output control device 422 used by the operating system 452, after stopping the operating system 452 once, the input/output control device 422 is changed to an alternative component and the external device 431 used by the operating system 452 is connected to the alternative component, and the operating system 452 is started again.

As described above, according to the third example, in a computer system which includes a plurality of respective components and can change a configuration dynamically, when a changeable component has a fault, it is possible to set so as to change the component to a spear component, and therefore, it is possible to improve system reliability.

Also, in a computer system in which a plurality of partitions can be arranged, it is possible to integrate and manage the fault recovery operation so as to be suitable to each operating system in each partition, and therefore, it is possible to improve operation characteristics.

Fourth Example

Figure 12:
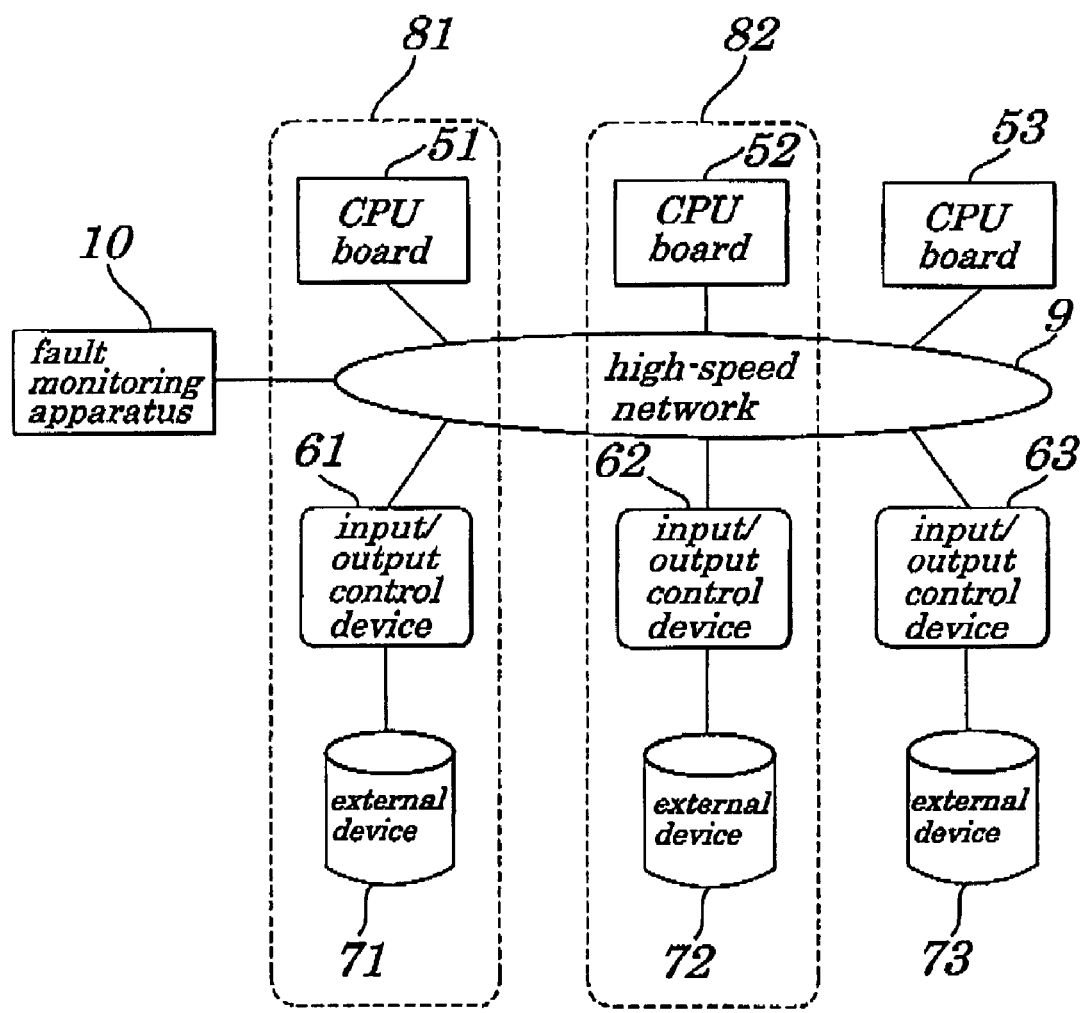
FIG. 12 is a block diagram showing a configuration according to a fourth example of the present invention.

FIG. 12 is a block diagram showing a configuration according to a fourth example of the present invention. The fourth example will be explained with reference to FIG. 12. In FIG. 12, a CPU board 51, a CPU board 52, and a CPU board 53, and an input/output control device 61, an input/output control device 62, and an input/output control device 63 are directly connected to a high-speed network 9.

Each CPU board and each input output/control device can communicate with any device connected to the high-speed network 9, and devices are combined to arrange a computer system.

An external device 71, an external device 72, and an external device 73 are respectively connected to the input/output control device 61, the input/output control device 62, and the input/output control device 63. In FIG. 12, the CPU board 51 and the input/output control device 61 are combined to arrange a system 81, and the CPU board 52 and the input/output control device 62 are combined to arrange a system 82. The CPU board 53 and the input/output control device 63 are not combined to any system. A fault monitoring apparatus 10 is connected to the high-speed network 9.

In the fourth example the present invention is applied to a distributed system in which each component is connected to the high-speed network 9 independently. In FIG. 12, the CPU board 53 and the input/output control device 63 which are not combined into any system are used as backup components for the system 81 and the system 82.

For example, it is possible to define a fault recovery operation in the fault monitoring apparatus 10 in a manner that when a fault occurs in the CPU board 51, the CPU board 51 is automatically removed from the system 81, and the CPU board is combined in the system 81.

It is thus apparent that the present invention is not limited to the above embodiments and examples but may be changed and modified without departing from the scope and spirit of the invention.

What is claimed is:

1. A computer recovery system for recovering automatically from a fault comprising at least one computer system and a fault monitoring apparatus for monitoring a fault in said at least one computer system, wherein said fault monitoring apparatus comprises a storage section for storing and holding fault recovery information including rules for defining recovery operations when faults occur in said at least one computer system, and a recovery instructing section, when a fault occurs in said at least one computer system, for retrieving said rules previously set in said fault recovery information and for instructing said at least one computer system in such a manner that a recovery operation corresponding a rule matching to said fault which occurs in said at least one computer system is carried out, wherein said fault recovery information includes component characteristic information including information showing characteristics of components making up said at least one computer system to be monitored by said fault monitoring apparatus, and wherein said fault monitoring apparatus, when instructing a fault recovery operation to said at least one computer system in which said fault occurs, considers efficiencies concerning components included in said at least one computer system based on said component characteristic information, and instructs said at least one computer system in which said fault occurs so as to select components which are used efficiently.

2. A computer recovery system for recovering automatically from a fault comprising at least one computer system and a fault monitoring apparatus for monitoring a fault in said at least one computer system, wherein said fault monitoring apparatus comprises a storage section for storing and holding fault recovery information including rules for defining recovery operations when faults occur in said at least one computer system, and a recovery instructing section, when a fault occurs in said at least one computer system, for retrieving said rules previously set in said fault recovery information and for instructing said at least one computer system in such a manner that a recovery operation corresponding a rule matching to said fault which occurs in said at least one computer system is carried out, wherein said fault recovery information includes classification of each of faults which occurred previously and configuration information of said at least one computer system at a time at which a fault occurs as fault example storage information, and wherein said fault monitoring apparatus further comprises an avoidance instructing section which, when instructing a fault recovery operation to said at least one computer system in which said fault occurs, refers to fault information of past occurrences, and instructs said at least one computer system in which experienced said fault so as to avoid a computer system configuration in which a fault is apt to occur.

3. A computer recovery system for recovering automatically from a fault comprising at least one computer system and a fault monitoring apparatus for monitoring a fault in said at least one computer system, wherein said fault monitoring apparatus comprises a storage section for storing and holding fault recovery information including rules for defining recovery operations when faults occur in said at least one computer system, and a recovery instructing section, when a fault occurs in said at least one computer system, for retrieving said rules previously set in said fault recovery information and for instructing said at least one computer system in such a manner that a recovery operation corresponding a rule matching to said fault which occurs in said at least one computer system is carried out, wherein said fault recovery information includes a system requisite rule which is a rule of a computer system to be met by said at least one computer system which is an object of monitoring and information for defining an operation for satisfying said rule as computer system configuration rule information, and wherein said fault monitoring apparatus further comprises a change instructing section which, when fault recovery of said at least one computer system in which a fault occurs, instructs said at least one computer system to change a computer system configuration after said fault recovery operation in accordance with a request specification of a whole system of said at least one computer system based on said system requisite rule.

4. A computer recovery system for recovering automatically from a fault comprising at least one computer system and a fault monitoring apparatus for monitoring a fault in said at least one computer system,
  wherein said fault monitoring apparatus comprises a storage section for storing and holding fault recovery information including rules for defining recovery operations when faults occur in said at least one computer system, and a recovery instructing section, when a fault occurs in said at least one computer system, for retrieving said rules previously set in said fault recovery information and for instructing said at least one computer system in such a manner that a recovery operation corresponding a rule matching to said fault which occurs in said at least one computer system is carried out, and
  wherein said fault monitoring apparatus further comprises:
  a first processing section, when a fault occurs in said at least one computer system, for checking whether said fault which occurs is a component fault or not, and for, when said fault is said component fault, storing system configuration information at a time when said fault occurs in a storage area for memorizing fault examples as fault example storage information;
  a second processing section for referring to said fault example storage information to refer to past fault examples, for checking whether or not there is a same fault example that has occurred this time, for, when there is said same fault example, comparing system configuration information in the past same fault example with a computer system configuration in which said fault occurs, for extracting a feature of said computer system configuration, and for memorizing said characteristic related to said fault information as fault example storage information;
  a counting section for counting a frequency of fault occurrences for every feature of said computer system configuration when said fault occurs based on an extracted feature of computer system configuration; and
  a third processing section for checking a frequency of fault occurrences for every feature of said computer system configuration, and for registering a rule for avoiding an extracted feature of a computer system configuration in said component characteristic information, when said frequency of fault occurrences is more than a predetermined number.

5. A computer recovery system for recovering automatically from a fault comprising at least one computer system and a fault monitoring apparatus for monitoring a fault in said at least one computer system,
  wherein said fault monitoring apparatus comprises a storage section for storing and holding fault recovery information including rules for defining recovery operations when faults occur in said at least one computer system, and a recovery instructing section, when a fault occurs in said at least one computer system, for retrieving said rules previously set in said fault recovery information and for instructing said at least one computer system in such a manner that a recovery operation corresponding a rule matching to said fault which occurs in said at least one computer system is carried out,
  wherein in said fault monitoring apparatus, said fault recovery information includes a fault type judging rule in which, when a fault occurs in said at least one computer system, a rule for judging at which position said fault occurs and what type of a fault as a recovery rule, and an operation specifying section in which an operation is specified when said fault occurs,
  wherein when a fault occurs in said at least one computer system, said fault information indicating a fault cause is notified from said fault monitoring agent to said fault monitoring apparatus,
  wherein said fault monitoring apparatus which receives said fault information refers to said fault recovery rule, retrieves a fault type judging rule corresponding to a condition of said fault which occurs,
  wherein said fault monitoring apparatus instructs said fault monitoring agent of an operation of contents described in said operation specifying section corresponding to said fault type judging rule matching said fault, and
  wherein a fault type judging rule used in a case of an unknown fault occurrence is previously prepared, and an operation specifying section corresponding to said fault type judging rule is registered in a lowest order of priority.

6. A computer recovery system for recovering automatically from a fault comprising at least one computer system and a fault monitoring apparatus for monitoring a fault in said at least one computer system,
  wherein said fault monitoring apparatus comprises a storage section for storing and holding fault recovery information including rules for defining recovery operations when faults occur in said at least one computer system, and a recovery instructing section, when a fault occurs in said at least one computer system, for retrieving said rules previously set in said fault recovery information and for instructing said at least one computer system in such a manner that a recovery operation corresponding a rule matching to said fault which occurs in said at least one computer system is carried out,
  wherein in said fault monitoring apparatus, said fault recovery information includes a fault type judging rule in which, when a fault occurs in said at least one computer system, a rule for judging at which position said fault occurs and what type of a fault as a recovery rule, and an operation specifying section in which an operation is specified when said fault occurs,
  wherein when a fault occurs in said at least one computer system, said fault information indicating a fault cause is notified from said fault monitoring agent to said fault monitoring apparatus,
  wherein said fault monitoring apparatus which receives said fault information refers to said fault recovery rule, retrieves a fault type judging rule corresponding to a condition of said fault which occurs,
  wherein said fault monitoring apparatus instructs said fault monitoring agent of an operation of contents described in said operation specifying section corresponding to said fault type judging rule matching said fault, and
  wherein in said fault monitoring apparatus, a condition where a load of an operating system exceeds a predetermined load state is previously registered as said fault type judging rule, and an operation is defined in which a CPU (Central Processing Unit) board is added to a corresponding computer system as a fault recovery operation corresponding to said fault type judging rule.

7. A computer recovery system for recovering automatically from a fault comprising at least one computer system and a fault monitoring apparatus for monitoring a fault in said at least one computer system, wherein said fault monitoring apparatus comprises a storage section for storing and holding fault recovery information including rules for defining recovery operations when faults occur in said at least one computer system, and a recovery instructing section, when a fault occurs in said at least one computer system, for retrieving said rules previously set in said fault recovery information and for instructing said at least one computer system in such a manner that a recovery operation corresponding a rule matching to said fault which occurs in said at least one computer system is carried out, and wherein said fault recovery information includes component characteristic information including information showing characteristics of components making up said at least one computer system to be monitored by said fault monitoring apparatus, wherein said fault monitoring apparatus, when instructing a fault recovery operation to said at least one computer system in which said fault occurs, considers efficiencies concerning components included in said at least one computer system based on said component characteristic information, and instructs said at least one computer system in which said fault occurs so as to select components which are used efficiently, and wherein said at least one computer system has a plurality of partitions respectively made up of a sub-computer system, and wherein said partitions are defined in said component characteristic information as alternative components, and when a fault occurs in an arbitrary component making up one of said plurality of partitions, said component is automatically changed to an alternative component.

8. A computer recovery system for recovering automatically from a fault comprising at least one computer system and a fault monitoring apparatus for monitoring a fault in said at least one computer system, wherein said fault monitoring apparatus comprises a storage section for storing and holding fault recovery information including rules for defining recovery operations when faults occur in said at least one computer system, and a recovery instructing section, when a fault occurs in said at least one computer system, for retrieving said rules previously set in said fault recovery information and for instructing said at least one computer system in such a manner that a recovery operation corresponding a rule matching to said fault which occurs in said at least one computer system is carried out, wherein in said fault monitoring apparatus, said fault recovery information includes a fault type judging rule in which, when a fault occurs in said at least one computer system, a rule for judging at which position said fault occurs and what type of a fault as a recovery rule, and an operation specifying section in which an operation is specified when said fault occurs, wherein when a fault occurs in said at least one computer system, said fault information indicating a fault cause is notified from said fault monitoring agent to said fault monitoring apparatus, wherein said fault monitoring apparatus which receives said fault information refers to said fault recovery rule, retrieves a fault type judging rule corresponding to a condition of said fault which occurs, wherein said fault monitoring apparatus instructs said fault monitoring agent of an operation of contents described in said operation specifying section corresponding to said fault type judging rule matching said fault, wherein said at least one computer system has a plurality of partitions respectively made up of a sub-computer system, wherein said fault monitoring apparatus is provided with said fault type judging rule and said operation specifying section which are different for each of said at least one computer systems, and wherein when said operating system differs for each of said partitions, said fault monitoring apparatus integrates each of partitions and executes an automatic fault recovery operation.

9. A computer recovery system for recovering automatically from a fault comprising at least one computer system and a fault monitoring apparatus for monitoring a fault in said at least one computer system, wherein said fault monitoring apparatus comprises a storage section for storing and holding fault recovery information including rules for defining recovery operations when faults occur in said at least one computer system, and a recovery instructing section, when a fault occurs in said at least one computer system, for retrieving said rules previously set in said fault recovery information and for instructing said at least one computer system in such a manner that a recovery operation corresponding a rule matching to said fault which occurs in said at least one computer system is carried out, and wherein each of said plurality computer systems makes up a cluster system whereby a node is configured, and wherein said fault monitoring apparatus includes at least one piece of node information, information showing that each node is capable of being a cluster with which node, and communication speed information of each network in said fault recovery information.

10. A computer recovery method for recovering automatically from a fault comprising:

a first step, when a fault occurs in at least one computer system, of notifying a fault monitoring apparatus of fault information by a fault monitoring agent in said at least one computer system in which said fault occurs;

a second step, by said fault monitoring apparatus, of storing said fault information in a fault example storage area, and of extracting a feature of a computer system configuration for said fault information;

a third step, by said fault monitoring apparatus, of referring to a fault recovery rule, of retrieving a fault type judging rule corresponding to a condition, and of instructing a fault monitoring agent to execute an operation described in a corresponding operation specifying section; and a fourth step, by said fault monitoring apparatus, of referring to a system configuration rule, of checking whether all of system requisite rules are met or not, and of instructing said fault monitoring agent to execute an operation described in said operation specifying section corresponding to said system requisite rule when there exists system requisite rule which said at least one computer system does not met.

11. The computer recovery method for recovering automatically from a fault according to claim 10, wherein said fault monitoring apparatus, comprises a fault recovery information section, said fault recovery information including:

component configuration information in which information concerning each component in said at least one computer system as an object to be monitored by said fault monitoring apparatus is registered, component characteristic information including information showing characteristics of components making said at least one computer system as said object to be monitored, a fault example storage area for memorizing a history of said fault information which occurs in said at least one computer system as said object to be monitored, a system configuration rule including a system requisite rule which is a rule of a computer system configuration to be met by said at least one computer system as said object to be monitored and an operation specifying section for defining an operation satisfying said system configuration rule, and a fault recovery rule including a fault type judging rule in which when a fault occurs in said at least one computer system, a rule for judging at which position said fault occurs and what type of said fault and an operation specifying section in which an operation to be executed when a fault occurs is specified.

12. The computer recovery method for recovering automatically from a fault according to claim 11, wherein said second step comprises:

a fifth step, when a fault occurs in said at least one computer system, by said fault monitoring apparatus, of checking whether said fault which occurs is a component fault or not, and of memorizing system configuration information at a time of fault occurrence in said fault example storage area in a case of said component fault;

a sixth step, by said fault monitoring apparatus, of referring to said fault example storage area to refer to past fault examples, of checking whether or not there exists a same fault example that has occurred this time, and when there is said same past fault example, of comparing a computer system configuration in said same past fault example with a computer system configuration in which said fault has occurred this time, of extracting a feature of said computer system configuration, and of memorizing said characteristic in said fault example storage area related to said fault information;

a seventh step, by said fault monitoring apparatus, based on extracted features of said computer system configuration, of counting a frequency of fault occurrences for every feature of said computer system configuration when said fault occurs;

an eighth step, by said fault monitoring apparatus, of checking a frequency of fault occurrences for every feature of said computer system configuration, and of registering a rule for avoiding an extracted feature of a computer system configuration in said component characteristic information, when said frequency of fault occurrences is more than a predetermined number.

13. The computer recovery method for recovering automatically from a fault according to claim 11, wherein said third step in said fault monitoring apparatus, comprises:

a ninth step of retrieving said fault recovery rule, checking whether there is an unchecked fault type judging rule or not, and of finishing a process when all of fault type judging rules are checked;

a tenth step of checking whether said fault which occurs matches with a fault type judging rule or not when there exists an unchecked fault type judging rule;

an eleventh step of returning to said step ninth when a fault content does not match with a fault type judging rule, and of instructing a fault monitoring agent to execute contents of said operation specifying section corresponding to said fault judging rule matching with said fault content when there is a fault judging rule matching with said fault content; and a twelfth step of checking whether an instructed operation is executed normally by said fault monitoring agent or not, of finishing a process when said instructed operation is executed normally, and of returning to said step ninth to repeat a same operation for said unchecked fault type judging rule when said instructed operation is not executed normally.

14. The computer recovery method for recovering automatically from a fault according to claim 13, wherein said eleventh step in said fault monitoring apparatus, comprises:

a thirteenth step of selecting an operation having a highest order of priority among operations described in said operation specifying section;

a fourteenth step of instructing said fault monitoring agent to execute a selected operation; and a fifteenth step of checking whether said selected operation is executed normally or not, of reporting the normal execution to a higher process and of finishing a process when said selected operation is executed normally, of checking whether an operation having a second higher order priority is specified in said operation specifying section or not when said operation fails, of reporting that said operation described in said operation specifying section fails to said higher process and of finishing said process.

15. The computer recovery method for recovering automatically from a fault according to claim 14, wherein said fourteenth step in said fault monitoring apparatus, comprises:

a sixteenth step of checking whether a system to be an object of an operation is specified during operation defining or not;

a seventeenth step of making a specified system as an object system when said object system is specified;

an eighteenth step of making a system in which a fault occurs as said object system when no system is specified.

16. The computer recovery method for recovering automatically from a fault according to claim 15, wherein said fourteenth step in said fault monitoring apparatus, comprises:

a nineteenth step of checking whether an operation which will be executed is to change said at least one computer system or not, and of advancing to a twenty second step when said operation is not to change said at least one computer system;

a twentieth step of checking whether an object component of a configuration change operation is specified or not when said operation is to change said at least one computer system;

a twenty first step of referring to said component characteristic information to decide an object component of said configuration change operation when a component to be an object of said configuration change is not specified;

the twenty second step of instructing a specified operation to said fault monitoring agent of said at least one computer system to be recovered;

a twenty third step of checking whether an operation instructed in said at least one computer system is normally executed or not, of reporting to a higher process that said operation is successful, of checking whether an operation object component selected in said twenty first step remains or not when an instructed operation fails, and of returning to said twenty second step when remaining; and a twenty fourth step of reporting that said operation has failed when said operation for all object components has failed.

17. A fault monitoring apparatus connected to at least one computer system and monitoring a fault in said at least one computer system, comprising:

a storage section for memorizing and holding fault recovery information including a rule which defines a recovery operation when a fault occurs in said at least one computer system, wherein said fault monitoring apparatus, when a fault occurs in said at least one computer system, retrieves a rule previously set in said fault recovery information and instructs said at least one computer system to execute a recovery operation corresponding to said fault which occurs in said at least one computer system, wherein said fault recovery information includes component characteristic information including information showing characteristics of components included in said at least one computer system monitored by said fault monitoring apparatus, and wherein said fault monitoring apparatus, when instructing a fault recovery operation to said at least one computer system in which said fault occurs, considers efficiencies concerning components included in said at least one computer system based on said component characteristic information, and instructs said at least one computer system in which said fault occurs so as to select components which are used efficiently.

18. A fault monitoring apparatus connected to at least one computer system and monitoring a fault in said at least one computer system, comprising:

a storage section for memorizing and holding fault recovery information including a rule which defines a recovery operation when a fault occurs in said at least one computer system, wherein said fault monitoring apparatus, when a fault occurs in said at least one computer system, retrieves a rule previously set in said fault recovery information and instructs said at least one computer system to execute a recovery operation corresponding to said fault which occurs in said at least one computer system, wherein types of past faults which occurred and configuration information of said at least one computer system at a time at which a fault has occurred are registered in said storage section as fault example storage information, and wherein said fault monitoring apparatus, when instructing a fault recovery operation to said at least one computer system in which said fault has occurred, refers to fault information of past occurrences in said fault example storage information, and instructs said at least one computer system in which said fault occurs so as to avoid a computer system in which a fault is apt to occur.

19. A fault monitoring apparatus connected to at least one computer system and monitoring a fault in said at least one computer system, comprising:

a storage section for memorizing and holding fault recovery information including a rule which defines a recovery operation when a fault occurs in said at least one computer system, wherein said fault monitoring apparatus, when a fault occurs in said at least one computer system, retrieves a rule previously set in said fault recovery information and instructs said at least one computer system to execute a recovery operation corresponding to said fault which occurs in said at least one computer system, wherein a system requisite rule which is a rule of a computer system to be met by a at least one computer system as an object to be monitored and information for defining an operation for meeting said rule are registered in said storage section as system configuration rule information, and wherein there is provided a controller that, when fault recovery of said at least one computer system in which a fault occurs, instructs said at least one computer system to change a computer system configuration after said fault recovery operation in accordance with a request specification of a whole system of said at least one computer system based on said system requisite rule.

20. A fault monitoring apparatus connected to at least one computer system and monitoring a fault in said at least one computer system, comprising:

a storage section for memorizing and holding fault recovery information including a rule which defines a recovery operation when a fault occurs in said at least one computer system, wherein said fault monitoring apparatus, when a fault occurs in said at least one computer system, retrieves a rule previously set in said fault recovery information and instructs said at least one computer system to execute a recovery operation corresponding to said fault which occurs in said at least one computer system;

a first processing section, when a fault occurs in said at least one computer system, for checking whether said fault which occurs is a component fault or not, and for, when said fault is said component fault, storing system configuration information at a time when said fault occurs in fault example storage information;

a second processing section for referring to said fault example storage information to refer to past fault examples, for checking whether or not there is a same fault example that has occurred this time, for, when there is the same fault example, comparing system configuration information in said past same fault example with a computer system configuration in which said fault has occurred this time, for extracting a feature of said computer system configuration, and for memorizing said characteristic related to said fault information as fault example storage information in said storage section;

a counting section for counting a frequency of fault occurrences for every feature of said at least one computer system when said fault occurs based on an extracted feature of computer system configuration; and a third processing section for checking a frequency of fault occurrences for every feature of said computer system configuration, and for registering a rule for avoiding an extracted feature of a computer system configuration in said component characteristic information, when said frequency of fault occurrences is more than a predetermined number.

21. A medium storing a program being used in a fault monitoring apparatus connected to a first computer, wherein said fault monitoring apparatus is programmed with a fault recovery information including a rule defining a recovery operation when a fault occurs in said first computer, wherein when a fault occurs in said first computer, said fault monitoring apparatus' programming causes a second computer to execute a process that refers to said rule, instructs said first computer to perform a fault recovery operation corresponding to said fault and to execute a recovery operation corresponding to said rule, and further causing said second computer to execute:

a process, when a fault occurs in said first computer, of storing fault information notified from a fault monitoring agent in said first computer in which said fault occurs in a fault example storage area, and of extracting a feature of said first computer configuration for said fault information;

a process, when said fault occurs in said first computer, of referring to a fault recovery rule including a fault type judging rule for judging which position said fault occurs and what type of said fault and an operation specifying section in which an operation to be executed when a fault occurs, of retrieving a fault type judging rule corresponding to a condition, and of instructing a fault monitoring agent to execute an operation described in a corresponding operation specifying section; and a process of referring to a system configuration rule including a system requisite rule which is a rule of said first computer's configuration to be met by said second computer to be monitored and an operation specifying section for defining an operation to satisfy said rule, of checking whether all of system requisite rules are met or not, and of instructing said fault monitoring agent to execute an operation described in said operation specifying section corresponding to said system requisite rule when there is a non-met system requisite rule.

* * * * *